US010484727B2

United States Patent
Lodato et al.

(10) Patent No.: US 10,484,727 B2
(45) Date of Patent: *Nov. 19, 2019

(54) METHODS AND SYSTEMS FOR USING 2D CAPTURED IMAGERY OF A SCENE TO PROVIDE VIRTUAL REALITY CONTENT

(71) Applicant: Verizon Patent and Licensing Inc., Arlington, VA (US)

(72) Inventors: Michael Lodato, Clinton, NJ (US); Rene Sepulveda, Fairfax Station, VA (US); Pai Moodlagiri, Clinton, NJ (US); Denny Breitenfeld, Florham Park, NJ (US); Syed Meeran Kamal, Raritan, NJ (US); Mohammad Raheel Khalid, Budd Lake, NJ (US); Xavier Hansen, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,719

(22) Filed: Jun. 1, 2018

(65) Prior Publication Data

US 2018/0352267 A1 Dec. 6, 2018

Related U.S. Application Data

(63) Continuation of application No. 15/610,575, filed on May 31, 2017, now Pat. No. 10,009,640.

(51) Int. Cl.
*H04N 13/00* (2018.01)
*H04N 21/2368* (2011.01)
(Continued)

(52) U.S. Cl.
CPC ....... *H04N 21/2368* (2013.01); *G01B 11/245* (2013.01); *G06T 7/55* (2017.01);
(Continued)

(58) Field of Classification Search
CPC . G06T 2207/10024; G06T 2207/10028; G06T 7/55
(Continued)

(56) References Cited

U.S. PATENT DOCUMENTS

2017/0094262 A1  3/2017 Peterson et al.
2018/0165879 A1* 6/2018 Holzer .................. G06T 19/006

OTHER PUBLICATIONS

Pece, et al., "Adapting Standard Video Codecs for Depth Streaming", Joint Virtual Reality Conference of EuroVR—EGVE (2011), R. Blach, S. Coquillart, M. D'Cruz, A. Steed, and G. Welch (Editors), Department of Computer Science, University College London, UK.

* cited by examiner

*Primary Examiner* — Jefferey F Harold
*Assistant Examiner* — Jean W Desir

(57) ABSTRACT

An exemplary method includes a virtual reality media provider system acquiring, from a plurality of capture devices physically disposed at different vantage points in relation to a scene, a distinct set of two-dimensional (2D) color data and depth data (2D data) for each capture device included in the plurality of capture devices, each distinct set of 2D data representing a distinct unmeshed view of the scene from a respective vantage point of a respective capture device included in the plurality of capture devices, acquiring metadata for each distinct set of 2D data, packaging each distinct set of 2D data into a transport stream such that the transport stream includes data representing each distinct unmeshed view of the scene from each respective vantage point of each respective capture device, and providing the metadata and the transport stream for streaming to a media player device.

20 Claims, 14 Drawing Sheets

(51) Int. Cl.
    *H04N 7/01*         (2006.01)
    *H04N 5/38*         (2006.01)
    *H04N 5/247*       (2006.01)
    *G06T 7/90*         (2017.01)
    *G06T 7/55*         (2017.01)
    *H04N 5/232*       (2006.01)
    *G01B 11/245*      (2006.01)
    *H04N 21/236*      (2011.01)
    *H04N 21/2343*     (2011.01)

(52) U.S. Cl.
    CPC ............... *G06T 7/90* (2017.01); *H04N 5/232* (2013.01); *H04N 5/247* (2013.01); *H04N 5/38* (2013.01); *H04N 7/0117* (2013.01); *H04N 21/236* (2013.01); *G06T 2207/10024* (2013.01); *G06T 2207/10028* (2013.01); *H04N 21/234309* (2013.01)

(58) Field of Classification Search
    USPC ............... 348/578, 571, 575, 630, 441, 582; 382/154, 285; 345/653, 654, 655, 629
    See application file for complete search history.

1102

```
{
  "sources": [
  {
    // stream IDs
    "color": { "stream": 32 },
    "depth": { "stream": 33 }, // depth mapping
    "near": 10.0,
    "far" : 20.0, // 3x4 column-major transform matrix
    "transform": [
    1, 0, 0,
    0, 1, 0,
    0, 0, 1,
    0, 0, 0
    ], // FOV tangent angles, to image edge (not edgemost sample center)
    "fov":{
    "tanX0": -0.2, // left
    "tanX1": 0.2, // right
    "tanY0": -0.1, // bottom
    "tanY1": 0.1 // top
    }
  }
  ]
}
```

Fig. 11

METHODS AND SYSTEMS FOR USING 2D CAPTURED IMAGERY OF A SCENE TO PROVIDE VIRTUAL REALITY CONTENT

RELATED APPLICATIONS

This application is a continuation application of U.S. patent application Ser. No. 15/610,575, filed May 31, 2017, and entitled "Methods and Systems for Using 2D Captured Imagery of a Scene to Provide Virtual Reality Content," which is hereby incorporated by reference in its entirety.

BACKGROUND INFORMATION

Advances in computing and networking technology have made new forms of media content possible. For example, virtual reality media content is available that immerses viewers (or "users") into interactive virtual reality worlds that the users may experience by directing their attention to any of a variety of things being presented in the virtual reality world at the same time. At any time during the presentation of the virtual reality media content, a user experiencing the virtual reality media content may look around the virtual reality world in any direction with respect to both a horizontal dimension (e.g., forward, backward, left, right, etc.) as well as a vertical dimension (e.g., up, down, etc.), giving the user a sense that he or she is actually present in and experiencing the virtual reality world from a particular viewpoint within the virtual reality world.

In some examples, a virtual reality media provider may provide virtual reality content that includes a virtual reality world by transmitting, by way of a network, data representative of the virtual reality world to a client computing device being used by a user to experience the virtual reality world. To this end, the virtual reality media provider implements a server system that performs processing to construct a three-dimensional ("3D") model of the virtual reality world, and to package and transmit data representative of the constructed 3D model of the virtual reality world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 11 illustrates an exemplary implementation for metadata according to principles described herein.

DETAILED DESCRIPTION OF PREFERRED EMBODIMENTS

Figure 1:
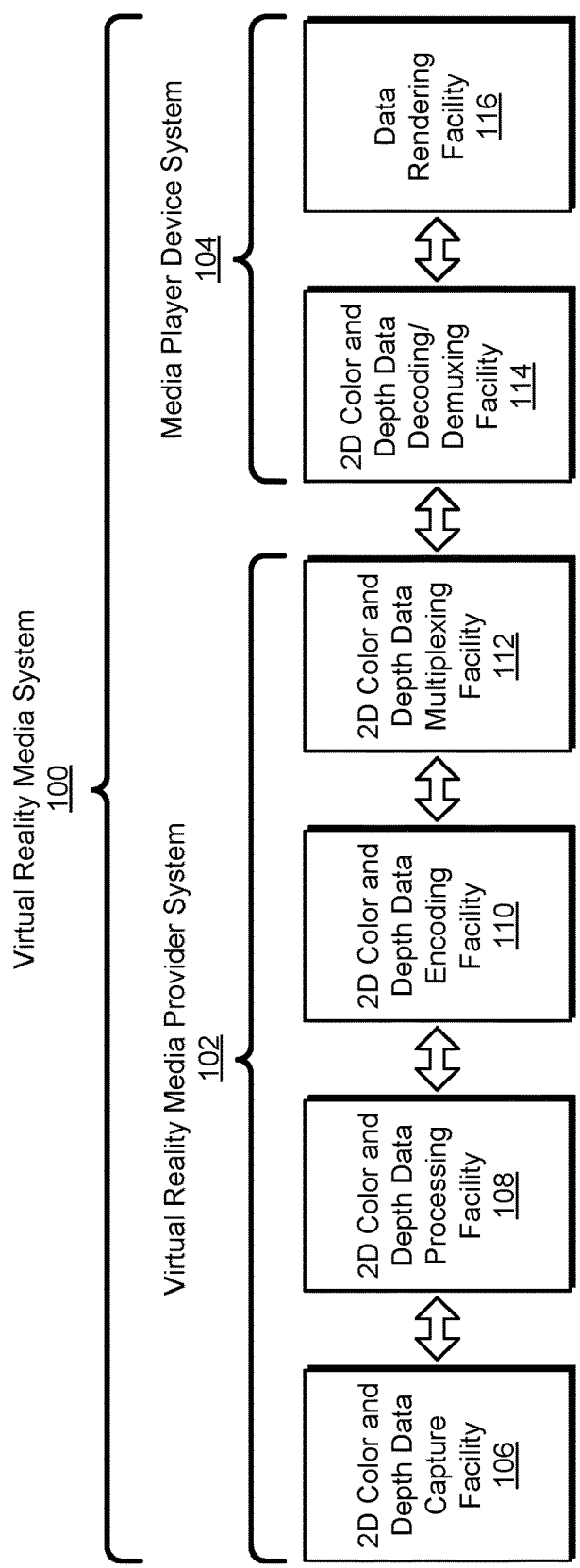
FIG. 1 illustrates an exemplary virtual reality media system according to principles described herein.

Methods and systems for using 2D captured imagery of a scene to provide virtual reality content are described herein. In certain exemplary methods and systems, a virtual reality media provider system may acquire surface data (e.g., 2D captured imagery) for a scene (e.g., a real-world scene) from a plurality of capture devices (e.g., video cameras, 3D depth scanning hardware, etc.) physically disposed at different vantage points in relation to the scene (e.g., at different positions having different capture angles in relation to the scene). The acquired surface data may include 2D color data and depth data for surfaces of one or more objects in the scene, as captured by each capture device included in the plurality of capture devices.

The 2D color data and depth data captured by each of the capture devices may represent a distinct unmeshed view of the scene from a particular vantage point relative to the scene. As used herein, a "distinct unmeshed view" corresponds to a view of a scene from a particular capture device in which the surface data for the scene (e.g., the 2D color data and depth data) captured by the particular capture device is not combined (i.e., not meshed) together with the surface data captured by another capture device to form a 3D model or 3D representation of the scene.

Based on the acquired 2D color data and depth data, the virtual reality media provider system may generate a color video data stream for the 2D color data and a depth video data stream for the depth data for each capture device included in the plurality of capture devices. The color video data streams and depth video data streams may be generated in any suitable data stream format as may suit a particular implementation. For example, the 2D color data included in each color video data stream may be formatted as a series of sequential 2D color data captures (e.g., high-resolution still images) of the scene captured by a respective capture device included in the plurality of capture devices. In addition, the depth data included in each depth video data stream may be formatted as a series of sequential 2D depth data captures of the scene captured by a respective capture device included in the plurality of capture devices.

The virtual reality media provider system may also acquire metadata associated with the scene. The metadata may include information associated with the scene, such as information about intrinsic and extrinsic properties of the plurality of capture devices, that is usable by an appropriately configured media player device, together with the surface data captured by the plurality of capture devices, to generate a 3D representation of the scene that may be used by the media player device to render a view of the scene from an arbitrary viewpoint in the scene for presentation to a user of the media player device.

The virtual reality media provider system may process and provide at least some of the acquired surface data and metadata for streaming to a media player device by way of network. For example, the virtual reality media provider system may package at least some of the generated color video data streams and depth video data streams into a transport stream. As such, in certain examples, the transport stream may include, for each capture device included in the plurality of capture devices, data representing a respective distinct unmeshed view of the scene from a respective particular vantage point in relation to the scene. Exemplary transport streams are described herein.

The virtual reality media provider system may provide the transport stream and the metadata for streaming to a media player device. In certain examples, the virtual reality media provider system may stream the transport stream and the metadata to the media player device through any suitable communication channel, such as those described herein. Alternatively, the virtual reality media provider system may provide the transport stream and the metadata to a content delivery network ("CDN") (e.g., a third-party CDN) for streaming to the media player device. In certain examples, the virtual reality media provider system may include the metadata in the transport stream and provide the transport stream for streaming such that the metadata is streamed to the media player device as part of the transport stream. In other examples, the virtual reality media provider system may provide the metadata and the transport stream separately for streaming such that the metadata may be streamed separately from the transport stream.

The media player device may be configured to receive and process the metadata and the transport stream to access and use the metadata, the color video data stream, and the depth video data stream for each of the capture devices included in the plurality of capture devices to generate a 3D representation of the scene in a virtual 3D space. For example, the media player device may use the metadata and the 2D color data and depth data from a first capture device and the 2D color data and depth data from a second capture device to at least partially construct a 3D representation of a scene (e.g., a 3D representation of an object in the scene) from a viewpoint of a user of the media player device.

Methods and systems described herein may significantly reduce the amount of bandwidth required to provide virtual reality content to a media player device by way of a network. For example, instead of generating a 3D model of a scene server-side, methods and systems described herein generate and transmit 2D data representative of distinct unmeshed views of a scene to a media player device by way of a network. As will be made apparent herein, this significantly reduces the amount of data that is required to be processed server-side and transmitted over the network resulting in real time streaming of virtual reality content at increased speeds, reduced processing and reduced bandwidth.

Additionally or alternatively, methods and systems described herein may reduce or eliminate certain variations in the bandwidth required to deliver virtual reality content that have traditionally depended on the complexity of the scene represented by the virtual reality content. For example, by generating and transmitting 2D data representative of a scene (instead of a 3D model of the scene) to a media player device by way of a network, methods and systems described herein may facilitate consistent bandwidth requirements for delivery of virtual reality content regardless of the complexity of a scene (e.g., regardless of how many objects are included in the scene at a given time). This is especially beneficial for a complex scene that includes numerous objects. According to conventional methods in which a 3D model of a scene is generated and transmitted to a media player device, each object included in the scene increases the amount of data required to represent the 3D model of the scene. As such, when there are numerous objects in the scene, the amount of data required to transmit a 3D model to a media player device according to the conventional methods becomes high. However, with the systems and methods described herein, the amount of bandwidth required to transmit the color video data streams and the depth video data streams remains substantially consistent regardless of the number of objects in the scene.

Additionally or alternatively, by generating and transmitting 2D data representative of a scene (e.g., by providing 2D color data and depth data representative of the scene as video data in a transport stream), methods and systems described herein may leverage existing video processing and streaming technologies and existing graphics hardware (e.g., existing graphics cards) and/or software to form a data pipeline for delivery of virtual reality content, which data pipeline may conserve processing and/or network resources compared to conventional virtual reality delivery methods, support scalability of virtual reality content services, and/or expand the accessibility of virtual reality content. Examples of such a data pipeline are described herein.

The systems and methods described herein may provide additional or alternative benefits as may serve a particular implementation. Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality media system 100 ("system 100") that may generate and provide virtual reality content in accordance with methods and systems described herein. As shown, system 100 may include, without limitation, a virtual reality media provider system 102 and a media player device system 104. Virtual reality media provider system 102 may include, without limitation, a 2D color and depth data capture facility 106, a 2D color and depth data processing facility 108, a 2D color and depth data encoding facility 110, and a 2D color and depth data multiplexing facility 112 selectively and communicatively coupled to one another. It will be recognized that although facilities 106 through 112 are shown to be separate facilities in FIG. 1, facilities 106 through 112 may be combined into fewer facilities, such as into a single facility, or divided into more facilities as may serve a particular implementation. Each of facilities 106 through 112 may include or be housed in a device (e.g., having a single chassis) and located at a single location or distributed between multiple devices (e.g., servers) and/or multiple locations as may serve a particular implementation.

Media player device system 104 may include, without limitation, a 2D color and depth data decoding/demultiplexing facility 114 and a data rendering facility 116 selectively and communicatively coupled to one another. It will be recognized that although facilities 114 and 116 are shown to be separate facilities in FIG. 1, facilities 114 and 116 may be combined into fewer facilities, such as into a single facility, or divided into more facilities as may serve a particular implementation. Each of facilities 114 and 116 may include or be housed in a media player device, such as those described herein. In certain examples, the media player device may be located at a user location (e.g., a user premises such as a residence, a business, etc. or another location associated with the user of the media player device). Each of facilities 106 through 116 will now be described in more detail.

2D color and depth data capture facility 106 ("data capture facility 106") may include any hardware and/or software (e.g., computing systems, video and depth capture equipment, software programs, etc.) used for acquiring virtual reality content representative of a scene. The scene may include one or more objects, and the virtual reality content may include data representative of attributes of the objects in the scene, such as the appearance and location of surfaces of the objects in the scene.

In certain examples, the scene may be a real-world scene, such as a scene of a real-world event that may be occurring live (e.g., in real time). In such examples, the scene may include one or more real-world objects associated with the real-world event, and the acquired virtual reality content may be acquired in real time as the real-world event occurs. In other examples, the scene may be a virtual scene that includes one or more virtual objects. In other examples, the scene may be a merged-reality scene, and the scene may include at least one virtual object and at least one real-world object. The scene may be considered a 3D scene because each object and/or surface in the scene, whether real or virtual, has a detectable position in space with respect to the scene and other objects in the scene.

As used herein, an "object" may include anything that is visible (i.e., non-transparent) from a particular vantage point in a scene, whether living or inanimate. For example, if the scene corresponds to a real-world event such as a basketball game, objects may include the basketball being used for the game, the basketball court, the basketball standards (i.e., the backboards, rims, nets, etc.), the players and referees participating in the game, and/or any other object present at and/or associated with the basketball game.

In certain examples, data capture facility 106 may acquire virtual reality content representative of a scene in real time. For example, if the scene corresponds to a real-world event, data capture facility 106 may acquire virtual reality content representative of the scene in real time as the real-world event occurs. In other examples, data capture facility 106 may acquire virtual reality content that has been previously captured and stored for access and use in a time-shifted manner.

As used herein, "immersive virtual reality content" refers to any data and/or content associated with a scene that may be acquired, generated, and/or transmitted to a media player device configured to use the virtual reality content to render a 3D representation of the scene. For example, the virtual reality content may include surface data associated with the scene, metadata associated with the scene, audio data associated with the scene, and/or any other suitable data associated with the scene. Examples of such data are described herein. The virtual reality content may include data representative of real-world scene content, virtual content (e.g., one or more virtual objects), or a combination of real-world scene content and virtual content.

Data capture facility 106 may acquire the virtual reality content associated with the scene in any suitable manner. For example, data capture facility 106 may acquire, as surface data, 2D color data and depth data either directly or indirectly from a plurality of capture devices disposed at different vantage points relative to the scene and configured to capture the 2D color data and depth data. Examples of capture devices are described herein.

As used herein, "2D color data" may broadly include any data representative of how a scene appears from at least one vantage point of at least one device capturing the 2D color data. The 2D color data may include a color (e.g., red, green, blue, etc.) representation of the scene, a black and white representation of the scene, a greyscale representation of the scene, and/or any other suitable representation of the appearance of the scene. In certain examples, the 2D color data may include a captured sequence of images (e.g., high-resolution still images) representative of the appearance of the scene (e.g., an object at a real-world event) from a vantage point over a particular time period. For instance, the 2D color data may include 2D color video data of the scene in which a frame of video represents color values at pixel coordinates of the frame. However, the 2D color data is not limited to any particular format, file type, frame rate, resolution, quality level, or other characteristic that may be associated with various definitions and/or standards defining video in the art.

As used herein, "depth data" may broadly include any data representative of spatial positions of one or more objects (e.g., one or more objects at a real-world event) within the scene. The depth data may be formatted in any suitable manner. In certain examples, as will be described below, the depth data may be formatted as a series of sequential 2D depth data captures (e.g., separate instances of depth data captured at particular times) from a particular vantage point. For instance, the depth data may include 2D depth video data of the scene from a particular vantage point and in which a frame of video represents depth values at pixel coordinates of the frame. However, the depth data is not limited to any particular format, file type, frame rate, resolution, quality level, or other characteristic that may be associated with various definitions and/or standards defining video in the art. Preferably, the depth data has high precision and accuracy. However, the depth data may have generally lower resolution (e.g., lower x and y coordinate resolution) than the 2D color data and still be acceptable.

The depth data may be synchronized with the 2D color data. For example, a depth data frame in the depth data and a color data frame in the color data may correspond with a common instance in time (e.g., a same reference signal, timestamp, capture time, etc.). Such a corresponding depth data frame and color data frame may form a pair of synchronized frames that, together with synchronized pairs of other depth and color data frames captured from other vantage points, and with corresponding metadata, may be processed by a media player device to at least partially construct a 3D representation of a scene, as described herein.

In certain examples, data capture facility 106 may include the plurality of capture devices such as 2D video cameras, 3D depth scanners, combination capture devices (e.g., devices configured to capture both 2D video and associated depth data), and so forth. Each capture device included in the plurality of capture devices may capture surface data for the scene from a particular vantage point in relation to the scene. As used herein, a "vantage point" refers to a position and capture angle at which surface data of a scene is captured by each capture device included in the plurality of capture devices. In certain examples, the vantage point of a particular capture device may be fixed (i.e., the position of the particular capture device and the capture angle of the particular capture device do not change over time). Alternatively, one or more of the position and the capture angle of a particular capture device may change over time. For example, the position and/or the capture angle of a particular capture device may change over time as an apparatus to which the particular capture device is fixed moves in relation to the scene. A vantage point may be described by any other suitable information as may suit a particular implementation. Exemplary vantage points of capture devices are described herein.

The plurality of capture devices may capture 2D color data and depth data in any suitable manner and using any suitable devices as may serve a particular implementation. In certain examples, the capture devices may consist of video cameras or other types of image capture devices that may capture 2D color data of objects in a scene from multiple vantage points from which depth data for the surfaces of the objects may be captured (e.g., derived) by using one or more depth capture techniques (e.g., triangulation-based depth capture techniques, stereoscopic depth capture techniques, etc.).

In other examples, the capture devices may include video cameras or other types of image capture devices configured to capture the 2D color data, as well as separate depth capture devices configured to capture the depths of the surfaces of the objects using one or more of the depth capture techniques (e.g., time-of-flight-based depth capture techniques, infrared-based depth capture techniques, etc.). For example, each capture device may include a first component (e.g., a video camera device) configured to capture 2D video of objects at which the first component is directed, and a second component (e.g., a depth camera device, a 3D imaging or 3D scanning device, etc.) configured to capture depth data of objects at which the second component is directed. Is this example, the first component and the second component may be separate or discrete devices, but may be communicatively coupled and configured to work in conjunction with one another to synchronously (e.g., simultaneously) capture both the 2D color data and the depth data.

In other examples, each capture device may comprise a combination video-depth capture device (e.g., a specially-designed video camera) that is configured to capture both the 2D color data and the depth data. The combination video-depth capture device may be a commercially available or specially-designed video camera capable of not only capturing video data of objects in a scene but also detecting corresponding depths of the objects using one or more suitable depth capture techniques.

In some examples, the capture devices may have finite capture angles (e.g., 90 degrees, 120 degrees, etc.) and may be positioned and directed to capture data from respective areas of a scene. For example, a ring configuration of capture devices may be positioned to surround a scene or one or more portions of the scene (e.g., a basketball court, turns on a racetrack) and be pointed inwardly to capture data representative of objects in the scene. In the same or other examples, at least one particular capture device may have a 360-degree capture angle and may be positioned to capture data from objects surrounding the particular capture device. For example, at least one of capture devices may be a 360-degree camera configured to capture and/or generate a 360-degree video image of the scene around a center point corresponding to the 360-degree camera. While certain exemplary configurations of capture devices relative to a scene are described herein, the examples are illustrative only. Any suitable configuration of capture devices relative to a scene may be used in other implementations.

The plurality of capture devices may be communicatively coupled to one another (e.g., networked together) and/or communicatively coupled to another device or system (e.g., virtual reality media provider system 102) in any suitable manner, such as described herein. This may allow the capture devices to maintain synchronicity in time, position, angle, etc. in certain implementations. For example, the capture devices may send and receive timing signals to ensure that each capture device captures corresponding data at a common time (e.g., within a threshold range of time) and that the data captured by different capture devices may be timestamped with a universal time shared by all of the capture devices. In certain examples, a controller included in data capture facility 106 may direct the capture devices as to when to capture and/or output data for a scene. In other examples, the capture devices may control when data for a scene is captured and/or output, and data capture facility 106 may sort and/or selectively use the data received from the capture devices. These examples of how capture devices may function synchronously are exemplary only. Any suitable device synchronization and/or communication technologies may be used in other implementations to facilitate operations of capture devices to synchronously capture data for a scene. In certain alternative examples, one or more of the plurality of capture devices may function asynchronously, and the data captured for the scene may be processed and synchronized in any suitable manner after capture.

As mentioned, in certain examples, data capture facility 106 may include a plurality of capture devices. In alternative examples, data capture facility 106 may not include a plurality of capture devices and may be communicatively coupled to and acquire surface data for a scene from a plurality of capture devices using any suitable communication technologies.

Data capture facility 106 may also acquire metadata associated with the scene in any suitable manner and from any suitable source. In certain examples, for instance, data capture facility 106 may acquire metadata either directly or indirectly from the plurality of capture devices. In some examples, data capture facility 106 may acquire metadata from a data storage facility that stores the metadata.

The metadata may include any information that may be used, together with acquired surface data for a scene, by a media player device to render a 3D representation of the scene within a virtual 3D space. For example, the metadata may include, but is not limited to, information indicating temporal and spatial information associated with 2D color data for the scene, such as when the 2D color data was captured, a vantage point from which the 2D color data was captured, which capture device captured the 2D color data, etc. In addition, the metadata may include information indicating temporal and spatial information associated with depth data for the scene, such as when the depth data was captured, where the depth data was captured, a vantage point from which the depth data was captured, which capture device captured the depth data, etc. The metadata may also include field of view information (e.g., focal length, optical center, view angles, tangents of angles, etc.), depth mapping information, position information, orientation information, view angle information, translation information (e.g., transformation matrix information), changes in any of such information for each capture device, and/or information about any other intrinsic and/or extrinsic properties of the capture devices. In some examples, the metadata may include information about coordinate systems (e.g., local coordinate systems associated with the capture devices and/or scene), projection parameters, projection calculations, lens distortion parameters, and/or any other information useful for processing the acquired surface data in any of the ways described herein. In certain examples, the metadata may also include positional information for audio samples captured with respect to the scene. The metadata may be represented in any suitable format as may serve a particular implementation, such as Java Script Object Notation ("JSON"), Extensible Markup Language ("XML"), or the like. Exemplary metadata formats are described herein.

2D color and depth data processing facility 108 ("data processing facility 108") may include any hardware and/or software (e.g., computing systems, software programs, etc.) used for processing the virtual reality content (e.g., surface data, metadata, etc.) acquired by data capture facility 106. For example, data processing facility 108 may include one or more server systems or other computing devices running specialized and/or general-purpose image processing software. Data processing facility 108 may perform any suitable processing operations to prepare the data acquired by data capture facility 106 to be encoded by 2D color and depth data encoding facility 110. For example, data processing facility 108 may perform a processing operation to put the data into a format that is suitable for encoding, perform a processing operation to correct for lens distortions in the acquired data, perform a processing operation to correct for parallax in the acquired data, perform a processing operation to correct for depth discrepancies and/or orientation discrepancies between capture devices, and/or perform any other suitable processing operation as may suit a particular implementation.

In certain examples, data processing facility 108 may perform a processing operation to format the acquired 2D color data from each capture device into a series of sequential 2D color captures (e.g., a series of frames of video captured by each capture devices). In addition, data processing facility 108 may perform a processing operation to format the depth data from each of the capture devices into a series of sequential 2D depth data captures. As used herein, "a series of sequential 2D depth data captures" refers to separate captures of depth values at different time points in relation to the scene from each capture device. For example, a particular capture device may capture a first set of depth values in relation to the scene at a first time point, a second set of depth values in relation to the scene at a second time point, a third set of depth values in relation to the scene at a third time point, etc. as the series of sequential 2D depth data captures. The series of sequential 2D depth data captures may be considered as "2D" data because each 2D depth data capture only includes depth values captured by a capture device at a particular time point and does not include, for example, a 3D model or a 3D representation of the scene.

In certain examples, data processing facility 108 may perform a processing operation to format metadata acquired by data capture facility 108 into a suitable format for encoding. For example, processing facility 108 may perform a processing operation to format the metadata into a series of sequential metadata captures. Each metadata capture included in the series of sequential metadata captures may include metadata associated with a particular capture device at a particular point in time in relation to the scene. In addition, each metadata capture may be synchronized with a corresponding 2D color data capture and a corresponding 2D depth data capture.

In certain examples, all or part of the data acquired by data capture facility 106 may already be in a format suitable for encoding. Accordingly, in such examples, data processing facility 108 may bypass performing some types of processing operations on the acquired data, or processing facility 108 may be bypassed altogether or omitted from virtual reality media provider system 102.

2D color and depth data encoding facility 110 ("data encoding facility 110") may include any hardware and/or software (e.g., computing systems, networking systems, software programs, etc.) used for encoding data acquired by data capture facility 106 and/or processed (e.g., generated) by data processing facility 108. For example, data encoding facility 110 may include one or more server systems or other computing devices running specialized and/or general-purpose video encoding software. Data encoding facility 110 may encode surface data for a scene (i.e., surface data acquired by data capture facility 106 and processed by data processing facility 108) using any video codec suitable for generating a color video data stream and a depth video data stream for each capture device. For example, data encoding facility 110 may encode the surface data according to a H.264/MPEG-4 codec, a H.265/MPEG-H codec, or any other suitable codec. In certain examples, the color video data streams are at least 8-bit video streams, and the depth video data streams are 10-bit, 12-bit or better video streams. If the depth video data streams are provided as 8-bit video streams, further processing (e.g., tiling) may be performed for the depth video data streams.

2D color and depth data multiplexing facility 112 ("data multiplexing facility 112") may include any hardware and/or software (e.g., computing systems, networking systems, software programs, etc.) used for packaging the color video data streams and the depth video data streams generated by data encoding facility 110 into a transport stream. For example, data multiplexing facility 112 may include one or more server systems or other computing devices running specialized and/or general-purpose video multiplexing software. Data multiplexing facility 112 may generate a transport stream in any suitable manner. For example, data multiplexing facility 112 may multiplex the color video data streams and the depth video data streams using known multiplexing technologies (e.g., time-division multiplexing).

In certain examples, data multiplexing facility 112 may multiplex the color video data stream and the depth video data stream for each of the capture devices associated with the scene into a transport stream. For example, if there are six capture devices capturing surface data associated with the scene, there would be six color video data streams and six depth video data streams included in the transport stream. Alternatively, data multiplexing facility 112 may only multiplex a subset of the possible color video data streams and depth video data streams into the transport stream. To this end, data multiplexing facility 112 may also receive data representative of user input (e.g., selections of dynamically selectable viewpoints corresponding to arbitrary locations with respect to the scene) from users experiencing the scene using media player devices that render and present the virtual reality media content. Based on the data representative of the user input, data multiplexing facility 112 may selectively exclude some of the color video data streams and depth video data streams from being packaged into the transport stream. For example, data multiplexing facility 112 may selectively exclude a color video data stream and a depth video data stream that include surface data for one or more surfaces that would not be visible from a viewpoint of the user.

In certain examples, data multiplexing facility 112 may package each color video data stream and each depth video data stream as a separate stream within the transport stream (e.g., as a separate elementary stream within an MPEG transport stream). For example, the transport stream may include, for a given capture device, a color video data stream and a separate depth video data stream. Alternatively, data multiplexing facility 112 may multiplex each of the streams included in the transport stream into a single stream using any suitable multiplexing technology. As another alternative, data multiplexing facility 112 may multiplex multiple color video data streams into one color data stream within the transport stream, multiplex multiple depth video data streams into one depth data stream within the transport stream, and multiplex lookup information into the transport stream for use by a media player device to look up and parse the multiplexed data.

As used herein, "a transport stream" may refer to a single transport stream into which color video data streams and depth video data streams may be packaged, or to multiple transport streams into which color video data streams and depth video data streams may be packaged. Thus, in certain examples, a transport stream may refer to a single transport stream that carries video data streams for a captured scene (e.g., one color video data stream for each 3D capture device and one depth video data stream for each 3D capture device) as well as any metadata or other suitable data that may be included for transport in a particular implementation. In other examples, a transport stream may refer to a plurality of transport streams that collectively carry video data streams for a captured scene (e.g., one color video data stream for each 3D capture device and one depth video data stream for each 3D capture device) as well as any metadata or other suitable data that may be included for transport in a particular implementation.

A transport stream may include any type of transport stream (e.g., an MPEG transport stream or other type of transport stream) suitable for transporting video and/or other data from virtual reality media provider system 102 to media player device system 104. A transport stream may be configured in accordance with any suitable data format, container format, and/or transport protocol as may suit a particular implementation.

Data multiplexing facility 112 may provide a generated transport stream and metadata for streaming to media player device system 104. In certain examples, this may include data multiplexing facility 112 streaming the transport stream and the metadata to media player device system 104. In other examples, this may include data multiplexing facility 112 providing the transport stream and the metadata to a CDN that streams the transport stream and metadata to the media player device system 104. The providing of the transport stream and metadata for streaming may be accomplished in any suitable manner using any suitable streaming technologies (e.g., HTTP-based transport protocols).

Data multiplexing facility 112 may provide the metadata for streaming in any suitable manner. In certain examples, data multiplexing facility 112 may multiplex the metadata into the transport stream. For example, data multiplexing facility 112 may provide a separate metadata stream within the transport stream for each capture device. Alternatively, data multiplexing facility 112 may provide a global metadata stream and lookup information within the transport stream such that media player device system 104 may receive the transport stream and use the lookup information to identify and use metadata included in the global metadata stream. In alternative examples, data multiplexing facility 112 may provide the metadata separately from the transport stream in any suitable manner. Examples of transport streams and how metadata may be provided together with or separately from the transport streams are described herein.

Media player device system 104 may receive the streamed transport stream and metadata. 2D color and depth data decoding/demultiplexing facility 114 ("data decoding/demultiplexing facility 114") may perform one or more decoding and/or demultiplexing operations on the transport stream. Decoding/demultiplexing facility 114 may include any hardware (e.g., a dedicated graphics card) and/or software (e.g., computing systems, software programs, etc.) used for decoding and demultiplexing the color video data streams and the depth video data streams in the transport stream and the metadata. For example, data decoding/demultiplexing facility 114 may include one or more computing devices running specialized and/or general-purpose video decoding and demultiplexing software.

Data rendering facility 116 may use the decoded/demultiplexed color video data streams, depth video data streams, and metadata to render a 3D representation of a scene in a virtual 3D space. Data rendering facility 116 may include any hardware and/or software (e.g., computing systems, software programs, etc.) used for rendering a 3D representation of the scene. For example, data rendering facility 116 may leverage one or more graphics cards having one or more programmable graphics processing units ("GPU"s) to render a 3D representation of the scene. Examples of how data rendering facility 116 may render a 3D representation of a scene in a virtual 3D space based on the surface data and metadata received from virtual reality media provider system 102 are described herein.

Figure 2:
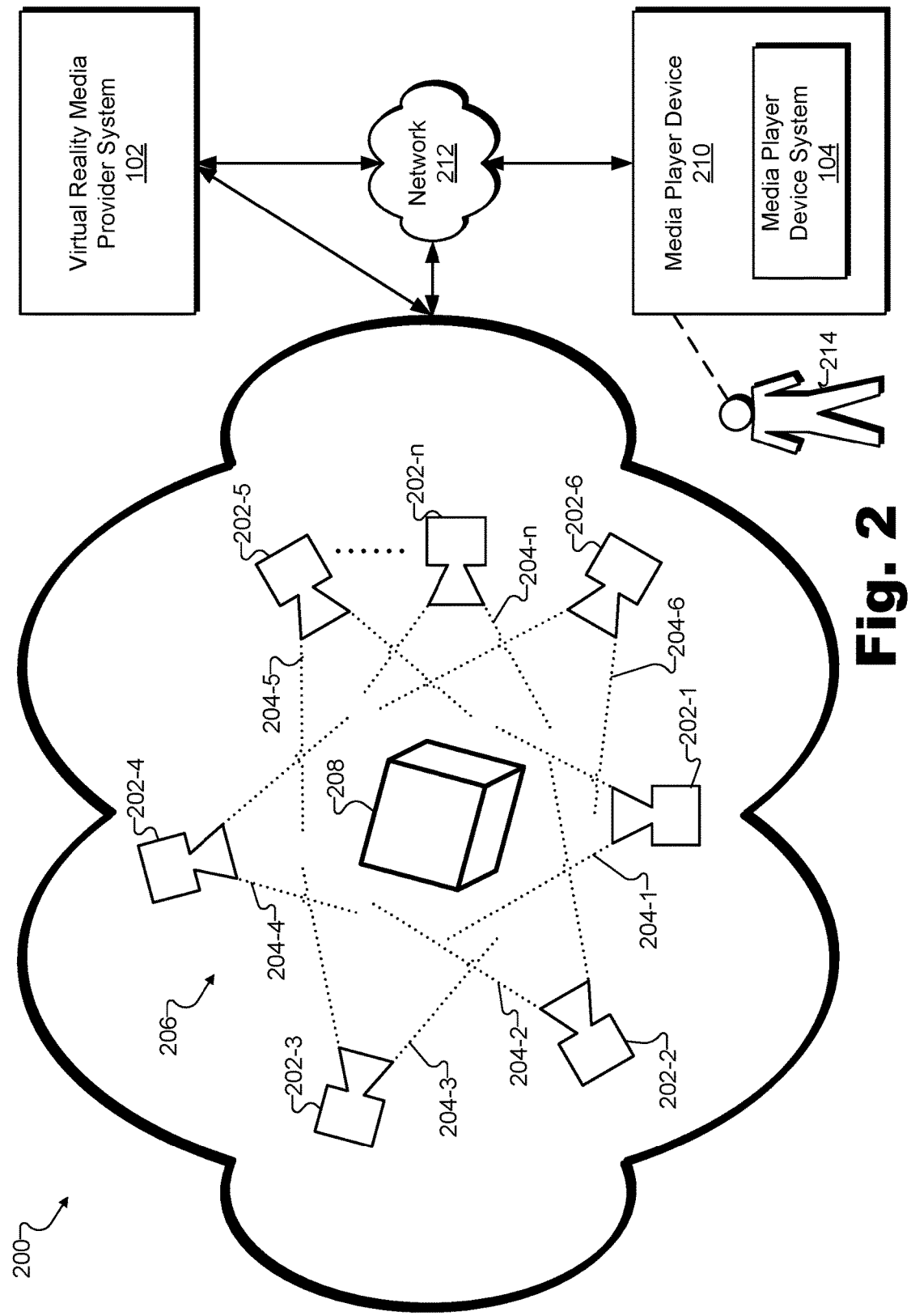
FIG. 2 illustrates an exemplary implementation of the virtual reality media system of FIG. 1 according to principles described herein.

FIG. 2 illustrates an exemplary implementation 200 of system 100 shown in FIG. 1. As shown, implementation 200 includes a plurality of capture devices 202 (e.g., capture devices 202-1 through 202-n) that are physically disposed at different vantage points (e.g., vantage points 204-1 through 204-n) in relation to a scene 206 that includes an object 208. Implementation 200 further includes virtual reality media provider system 102 communicatively coupled to the plurality of capture devices 202 and to a media player device 210 by way of a network 212.

The plurality of capture devices 202 ("capture devices 202") may be disposed (i.e., located, installed, etc.) at fixed positions with respect to scene 206 in any way that may serve a particular implementation. For example, capture devices 202 may be located at fixed positions surrounding a real-world event or one or more portions of the real-world event (e.g., surrounding or partially surrounding a field of play of a sporting event such as a basketball court at a basketball game).

In the example shown in FIG. 2, each of vantage points 204 provides a different limited view of object 208. For example, vantage point 204-2 of capture device 202-2 may provide a view from above object 208. From vantage point 204-2, capture device 202-2 may not be capable of capturing surface data for a bottom surface of object 208. However, capture device 202-1 may be positioned below object 208 and able to capture surface data for the bottom surface of object 208 from vantage point 204-1. Accordingly, capture devices 202 may be configured to, in combination, capture surface data for all of the surfaces of object 208.

Capture devices 202 may be communicatively coupled to each other and to virtual reality media provider system 102 in any suitable manner. As shown in FIG. 2, capture devices 202 may be communicatively coupled directly to virtual reality media provider system 102, to virtual reality media provider system 102 by way of network 212, or some combination thereof.

Network 212 may include any provider-specific wired or wireless network (e.g., a cable or satellite carrier network or a mobile telephone network), the Internet, a wide area network, or any other suitable network. Data may flow between capture devices 202, between virtual reality media provider system 102 and capture devices 202, or between virtual reality media provider system 102 and media player device 210 using any communication technologies, devices, media, and protocols as may serve a particular implementation. For example, capture devices 202 may communicate with each other and virtual reality media provider system 102 may communicate with capture devices 202 and/or with media player device 210 using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Markup Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., BLUETOOTH, Wi-Fi, etc.), in-band and out-of-band signaling technologies, and other suitable communications technologies. While only one network 212 is shown to interconnect virtual reality media provider system 102, capture devices 202, and media player device 210 in FIG. 2, it will be recognized that these devices and systems may intercommunicate by way of multiple and/or different interconnected networks as may serve a particular implementation.

In the example shown in FIG. 2, implementation 200 forms a data pipeline for delivery of virtual reality content (e.g., surface data, metadata, etc.) in which virtual reality content flows from the capture devices 202 to virtual reality media provider system 102 in any suitable manner (e.g., directly or through network 212) and from virtual reality media provider system 102 to media player device 210 by way of network 212. Virtual reality media provider system 102 processes the acquired virtual reality content as described herein to generate and provide the virtual reality content in at least one transport stream for streaming to media player device 210 by way of network 212 as part of the data pipeline. Because the data processed and provided by virtual reality media provider system 102 includes 2D color and depth data, such as described herein, the amount of data that is required to be processed by virtual reality media provider system 102 and transmitted over network 212 is significantly reduced compared to conventional virtual reality content delivery methods in which a 3D model is generated server-side and delivered over a network. Examples of how virtual reality content may flow through the data pipeline will now be described with reference to FIGS. 3-8.

Figure 3:
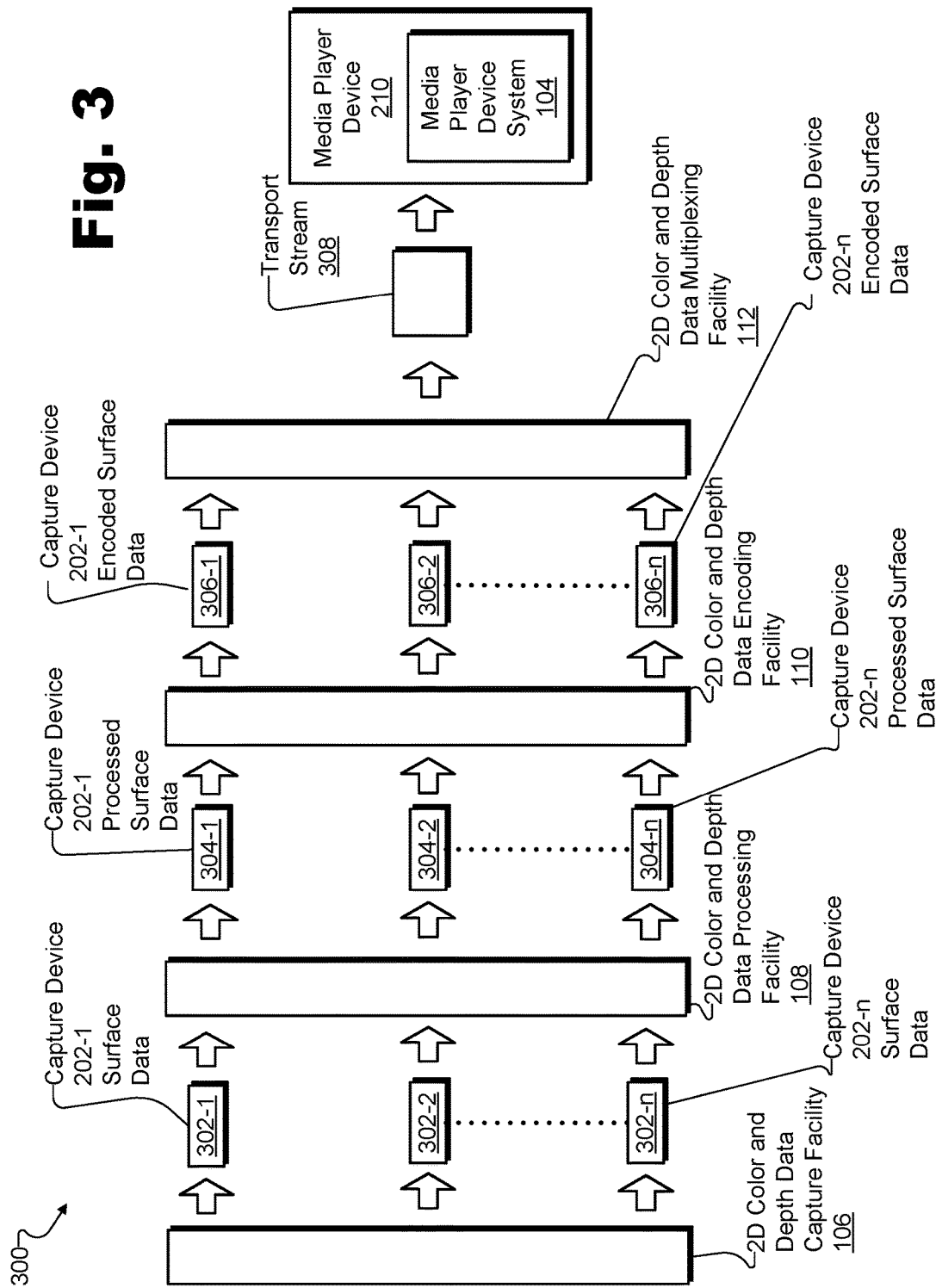
FIG. 3 illustrates an exemplary flow diagram depicting how surface data captured by a plurality of capture devices may be provided to a media player device by a virtual reality media content provider system according to principles described herein.

FIG. 3 illustrates an exemplary dataflow 300 that may be used in the data pipeline for providing virtual reality content (e.g., surface data) of a scene to media player device 210. The data in dataflow 300 may be generated, processed, distributed, etc., in any way described herein or as may serve a particular implementation. As shown in FIG. 3, data capture facility 106 may provide captured surface data 302 (e.g., captured surface data 302-1 through 302-n) to data processing facility 108. In FIG. 3, each illustrated instance of captured surface data 302-1 through 302-n corresponds to captured surface data from a respective capture device 202-1 through 202-n. Data processing facility 108 may receive and process captured surface data 302 in any suitable manner, such as described herein, to generate processed surface data 304 (e.g., processed surface data 304-1 through 304-n) for each capture device 202. Data processing facility 108 may provide processed surface data 304 to data encoding facility 110, which may generate, in any suitable manner such as described herein, encoded surface data 306 (e.g., encoded surface data 306-1 through 306-n) that is in a format suitable for streaming to media player device 210. Encoded surface data 306 may then be provided to data multiplexing facility 112, which may package encoded surface data 306 in any suitable manner into a transport stream 308. Data multiplexing facility 112 may then stream transport stream 308 to media player device 210 or otherwise provide transport stream 308 (e.g., to a CDN) to be streamed to media player device 210.

In certain examples, the surface data (e.g., captured surface data 302-1 through 302-n, processed surface data 304-1 through 304-n, encoded surface data 306-1 through 306-n, etc.) may be transmitted or otherwise provided throughout the dataflow 300 illustrated in FIG. 3 as separate color data streams and depth data streams for each capture device 202. For example, captured surface data 302-1, processed surface data 304-1, and encoded surface data 306-1 may each include a color data stream and a separate depth data stream for capture device 202-1. By representing and processing color and depth data in this manner, systems and methods described herein may significantly reduce the amount of processing done by virtual reality media provider system 102 compared to conventional methods at least because virtual reality media provider system 102 does not generate and process a 3D model of the scene.

Figure 4:
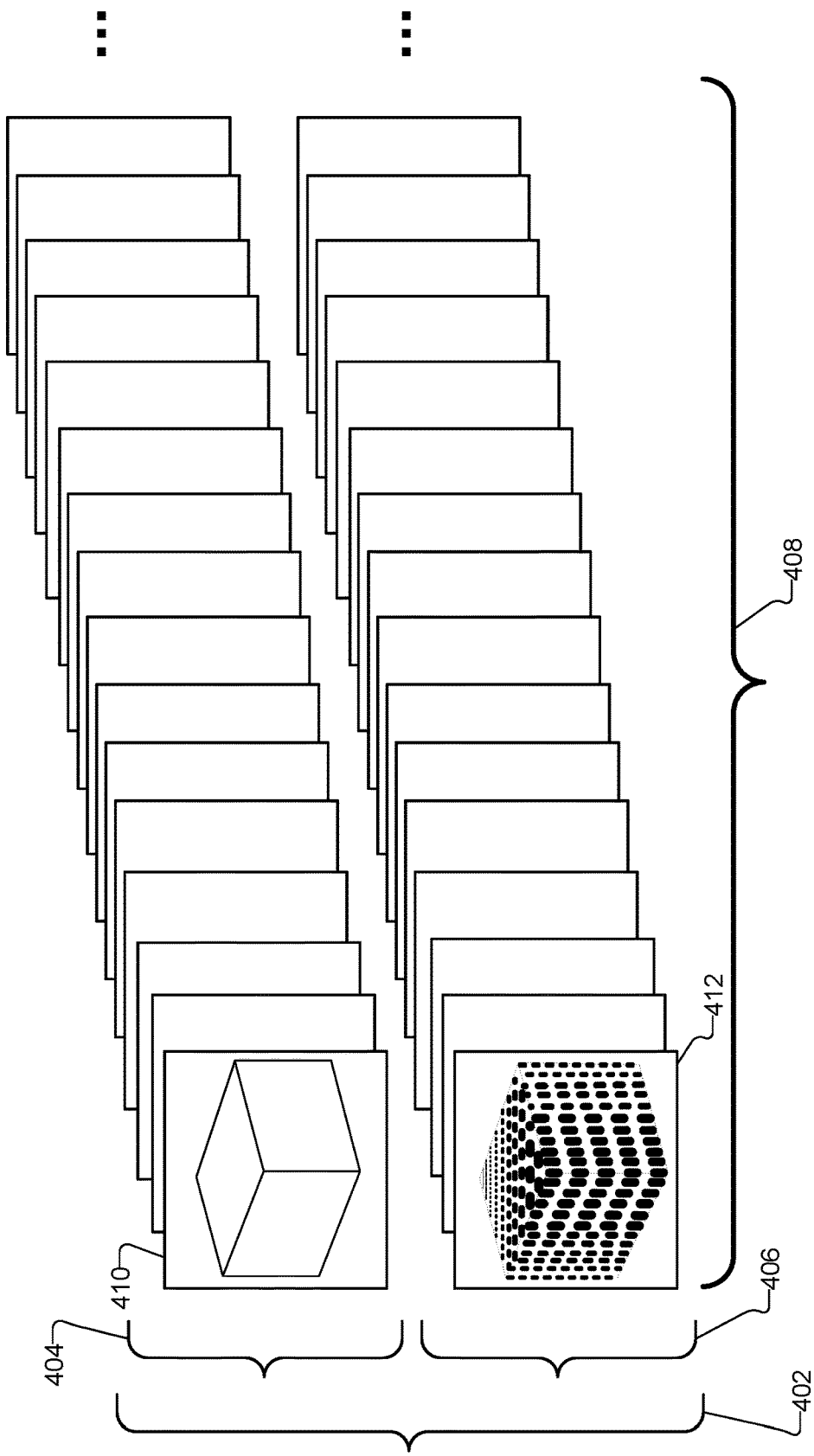
FIG. 4 illustrates exemplary surface data that may be acquired from a particular capture device during a particular temporal sequence according to principles described herein.

The surface data shown in FIG. 3 may be transmitted or otherwise provided throughout dataflow 300 as separate color data streams and depth data streams in any suitable manner. To illustrate, FIG. 4 shows exemplary surface data 402 that may be acquired by data capture facility 106 from, for example, capture device 202-2. As shown in FIG. 4, surface data 402 may include a series of sequential 2D color data captures 404 (e.g. frames of a color data stream) of scene 206 captured by the capture device 202-2 and a series of sequential 2D depth data captures 406 (e.g., frames of a depth data stream) of scene 206 captured by capture device 202-2. The series of sequential 2D color data captures 404 may represent color data of object 208 in scene 206 from vantage point 204-2 of capture device 202-2 during a particular temporal sequence 408 (e.g., a particular period of real time, a particular virtual timeline associated with the scene, etc.). The series of sequential 2D depth data captures 406 may represent depth data of object 208 in scene 206 from vantage point 204-2 of capture device 202-2 during the particular temporal sequence 408.

FIG. 4 also shows an exemplary 2D color data capture 410 included in the series of sequential 2D color data captures 404 and an exemplary 2D depth data capture 412 included in the series of sequential 2D depth data captures. 2D color data capture 410 may include color data, which may represent a view of scene 206 (including color data from the surfaces of object 208) visible from vantage point 204-2. While the color data is illustrated as an image in FIG. 4, it will be understood that the color data may be captured, encoded, formatted, transmitted, and represented in any suitable form. For example, the color data may be digital data that is formatted according to a standard video encoding protocol, a standard image format, or the like. The color data may represent a color image (e.g., similar to a color photograph) of the objects included within the scene as viewed from virtual vantage point 204-2. Alternatively, the color data may be a grayscale image representative of the objects (e.g., similar to a black and white photograph).

2D depth data capture 412 may include depth data for the surfaces of object 208 from a point in space associated with vantage point 204-2. Like the color data, the depth data represented in 2D depth data capture 412 may depict object 208 within scene 206 from the perspective of vantage point 204-2. However, rather than representing the visible appearance of object 208 (i.e., representing in color or grayscale how light interacts with the surfaces of object 208), the depth data may represent the depth (i.e., the distance or position) of points on surface of object 208 (e.g., as well as other objects within scene 206) relative to the position of vantage point 204-2. As with the color data, the depth data may be captured, encoded, formatted, transmitted, and represented in any suitable form. For example, as shown, the depth data may be represented by grayscale image data (e.g., six or eight bits for each pixel represented within the depth data). However, rather than representing how visible light reflects from the surfaces of object 208 (i.e., as represented in the color data), the grayscale image of the depth data may represent, for each pixel in the image, how far away the point represented by that pixel is from the position of vantage point 204-2. For example, points that are closer to vantage point 204-2 may be represented with values that represent darker shades of gray (e.g., binary values closer to 0b111111 in the case of a six-bit implementation where 0b111111 represents black). Conversely, points that are farther away from vantage point 204-2 may be represented with values that represent lighter shades of gray (e.g., binary values closer to 0b000000 in the case of the six-bit implementation where 0b000000 represents white).

Returning to FIG. 3, transport stream 308 may have any suitable composition and the various streams included therein may be arranged in any suitable manner as may suit a particular implementation. In certain examples, a transport stream may include a color video data stream, a depth video data stream, and a metadata stream for each capture device 202. To illustrate, FIG. 5 shows an exemplary transport stream 502 in which a color video data stream 504-1, a depth video data stream 506-1, and a metadata stream 508-1 are provided for capture device 202-1, a color video data stream 504-2, a depth video data stream 506-2, and a metadata stream 508-2 are provided for capture device 202-2, and a color video data stream 504-*n*, a depth video data stream 506-*n*, and a metadata stream 508-*n* are provided for capture device 202-*n*.

Figure 6:
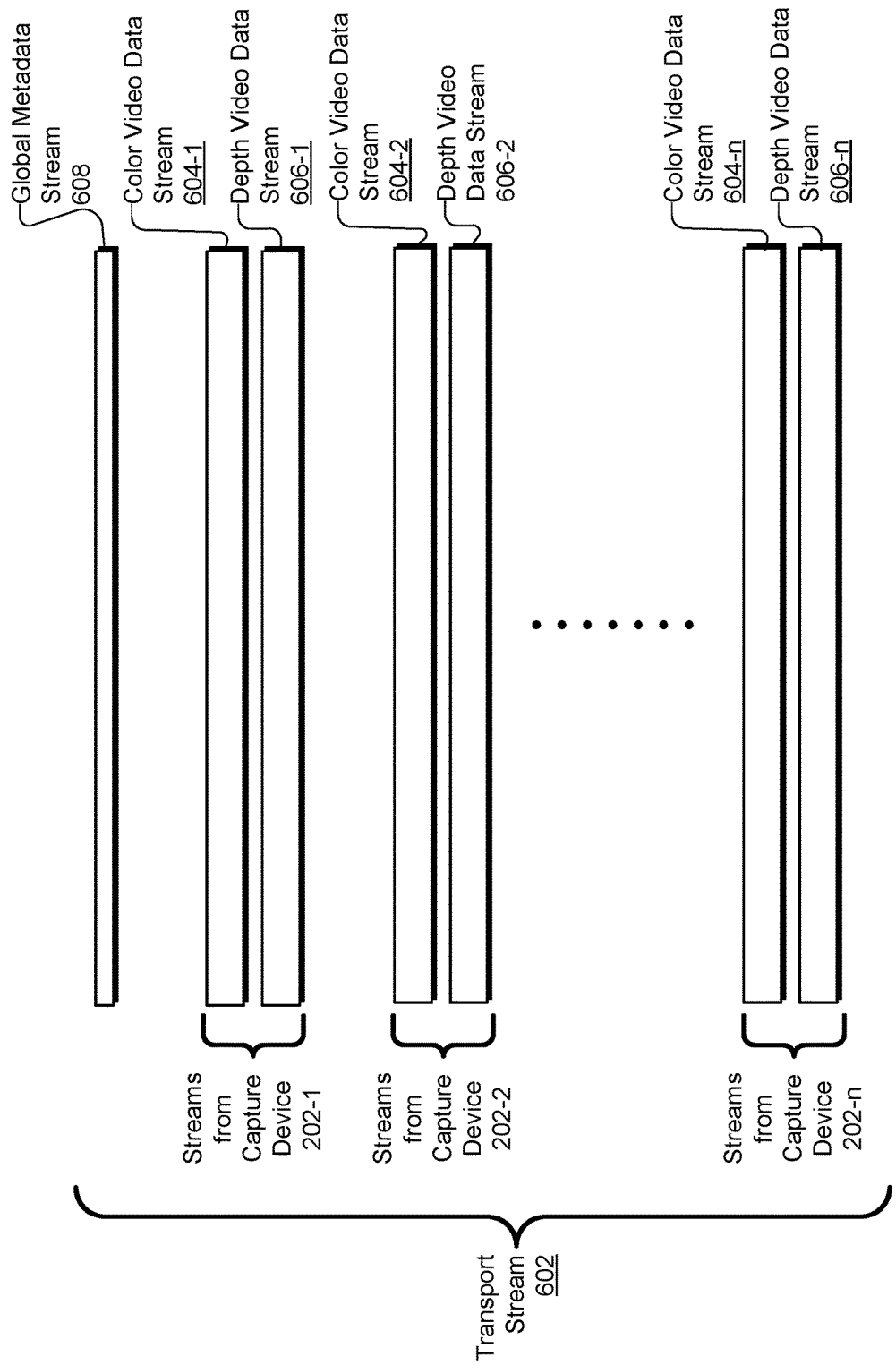

Alternatively, a transport stream may include a global metadata stream instead of a separate metadata stream for each capture device 202. To illustrate, FIG. 6 shows an exemplary transport stream 602 that includes a color video data stream 604 (e.g., color video data streams 604-1 through 604-*n*) and a depth video data stream 606 (e.g., depth video data streams 606-1 through 606-*n*) for each capture device 202 (e.g., capture devices 202-1 through 202-*n*) and a single global metadata stream 608. Global metadata stream 608 may include all of the metadata useful to facilitate media player device 210 generating a 3D representation of the scene. Global metadata stream 608 may also include lookup information that allows media player device 210 to parse and use metadata included in global metadata stream 608.

Figure 7:
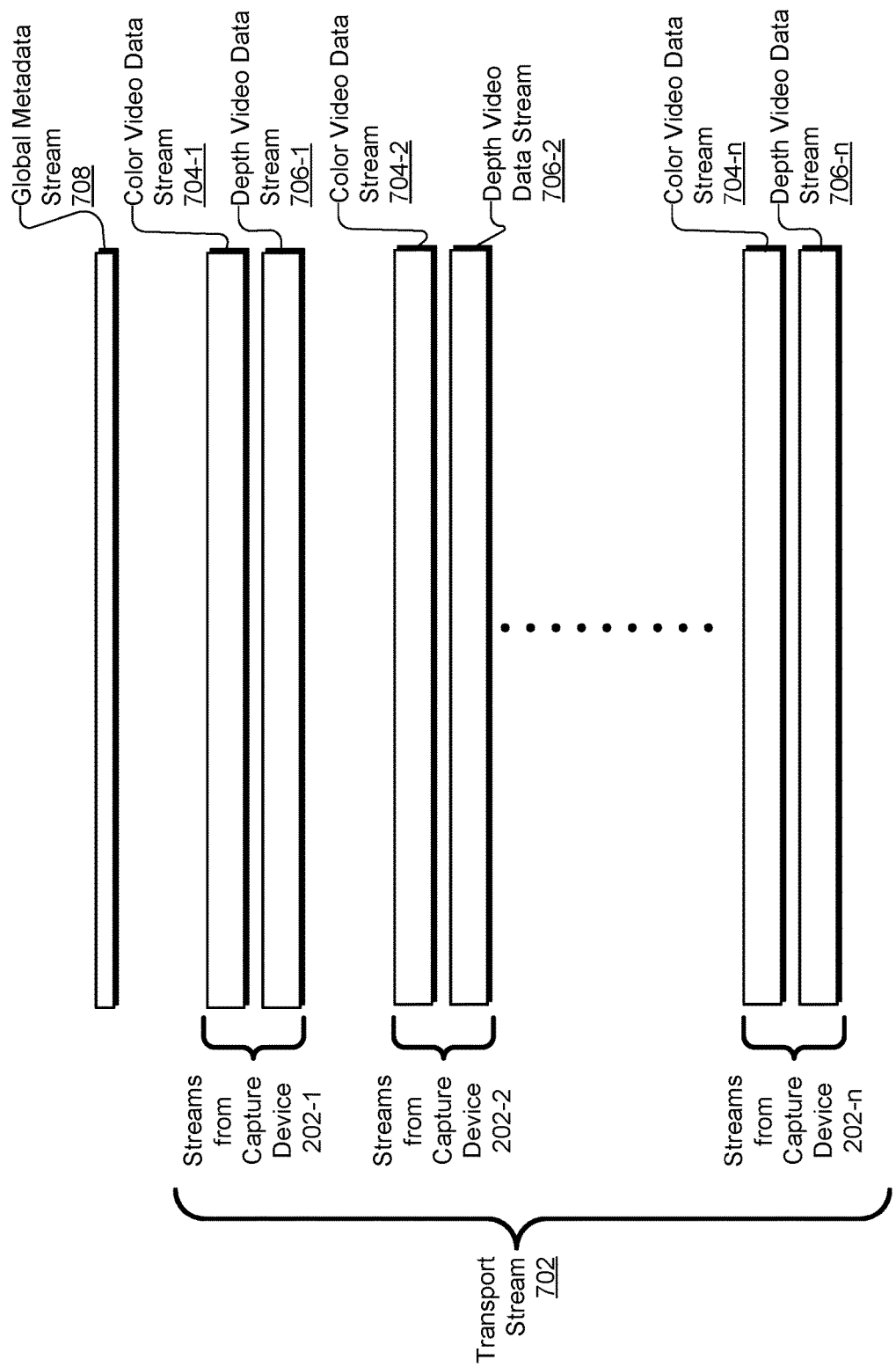

In certain examples, the metadata provided to media player device 210 may be provided separately from the transport stream. For example, FIG. 7 shows an exemplary transport stream 702 that includes a color video data stream 704 (e.g., color video data streams 704-1 through 704-*n*) and a depth video data stream 706 (e.g., depth video data streams 706-1 through 706-*n*) for each capture device 202 (e.g., capture devices 202-1 through 202-*n*) but that does not include metadata. Rather, a metadata stream 708 is provided separately from transport stream 702. Virtual reality media provider system 102 may provide metadata stream 708 for streaming to media player device 210 before, after, or concurrently with transport stream 702.

Figure 5:
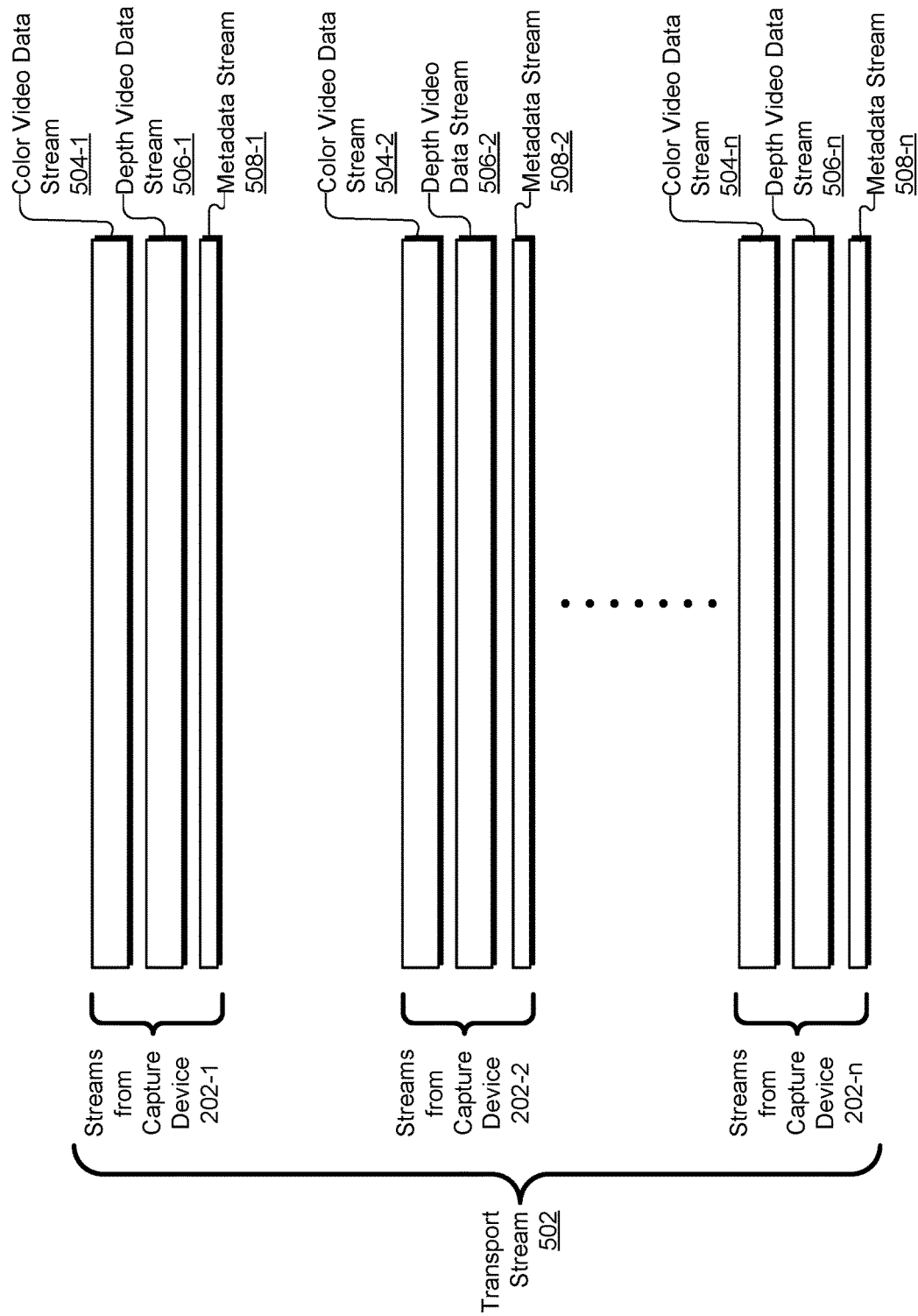
FIGS. 5-7 illustrate exemplary transport streams according to principles described herein.

The exemplary transport streams illustrated in FIGS. 5-7 are provided for illustrative purposes only. It is understood that a transport stream may have any other configuration as may suit a particular implementation. In addition, the metadata may be provided together or separately from the transport stream in any other manner as may suit a particular implementation. For example, the metadata may be provided within (e.g., at the beginning of, at the end of, in the middle of, etc.) one or more of the streams included in the transport stream (e.g., within one or more of the color video data streams and/or depth video data steams).

In certain examples, virtual reality media provider system 102 may select only a subset of an overall set of 2D color data and depth data captured for a scene at a point in time to be processed (e.g., encoded) and packaged into a transport stream for transmission to media player device 210. Virtual reality media provider system 102 may, therefore, exclude a remainder of the overall set of 2D color data and depth data captured for the scene at the point in time from being processed (e.g., encoded) and packaged into the transport stream. Virtual reality media provider system 102 may select which 2D color data and depth data to include and/or exclude from the transport stream based on any suitable criteria, such as a viewpoint of a user of media player device 210 with respect to a virtual 3D space associated with the scene.

Figure 8:
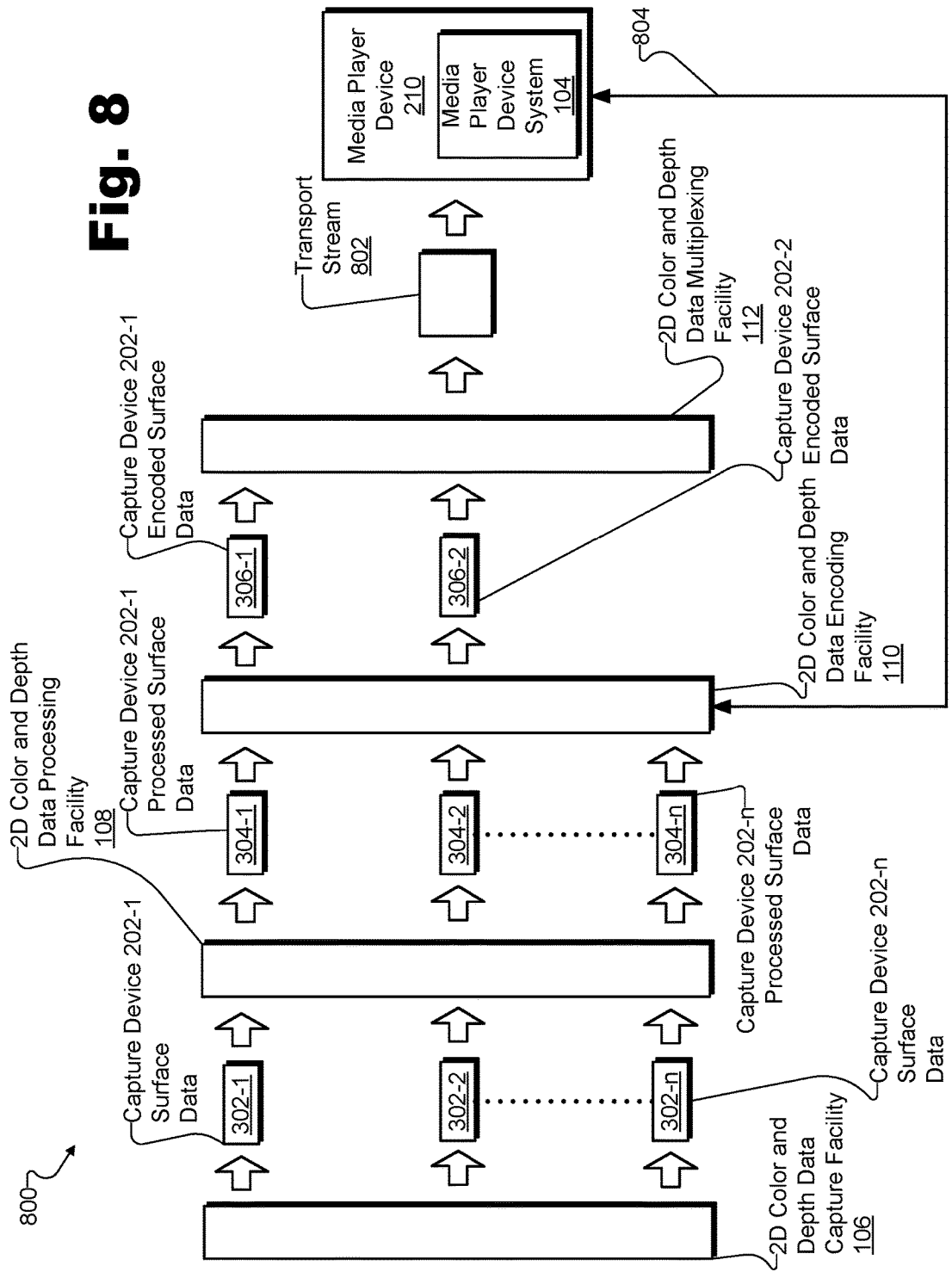
FIG. 8 illustrates an additional exemplary flow diagram depicting how surface data captured by a plurality of capture devices may be provided to a media player device by a virtual reality media content provider system according to principles described herein.

FIG. 8 illustrates another exemplary dataflow 800 that may be used in the data pipeline for providing virtual reality content (e.g., surface data) of a scene to media player device 210. The data in dataflow 800 may be generated, processed, distributed, etc., in any way described herein or as may serve a particular implementation. As shown in FIG. 8, dataflow 800 is similar to dataflow 300 illustrated in FIG. 3 except that dataflow 800 includes a transport stream 802 that is specifically configured based on feedback 804 provided by media player device 210. Feedback 804 may include any suitable feedback that may be used by virtual reality media provider system 102 to tailor transport stream 802 to media player device 210 and/or a particular viewpoint of user 214 of media player device 210. For example, feedback 804 may include information indicating a viewpoint of user 214, a change in viewpoint of user 214, and/or any other suitable information. Virtual media provider system 102 may use feedback 804 to specifically tailor transport stream 802 to the current viewpoint of user 214. To illustrate, a viewpoint of user 214 may change based on user 214 moving within a virtual reality world (e.g. a virtual 3D space). At the updated viewpoint, only a subset of the surface data captured from some of the capture devices 202 may be useful to media player device 210 to generate a 3D representation of the scene. Accordingly, virtual reality media provider system 102 may package the surface data (e.g. color video data streams and depth video data streams) for only some of capture devices 202 in the transport stream. In the example shown in FIG. 8, instead of packaging all surface data for the scene into transport stream 802, the surface data from only capture devices 202-1 and 202-2 is packaged within transport stream 802. By selectively including only a subset of data captured by a subset of capture devices 202 in transport stream 802 based on feedback 804 from media player device 210, systems and methods described herein may reduce the amount bandwidth required to deliver transport stream 802 and/or conserve data processing and/or storage resources of media player device 210.

Media player device 210 may provide information indicative of the updated viewpoint to virtual reality media provider system 102 as feedback 804 in any suitable manner and using any suitable communication protocol, such as those described herein. In the example shown in FIG. 8, feedback 804 is shown as being provided to data encoding facility 110 for illustrative purposes only. It is understood that any one or more of facilities 106 through 112 may receive feedback 804 in certain implementations.

Figure 9:
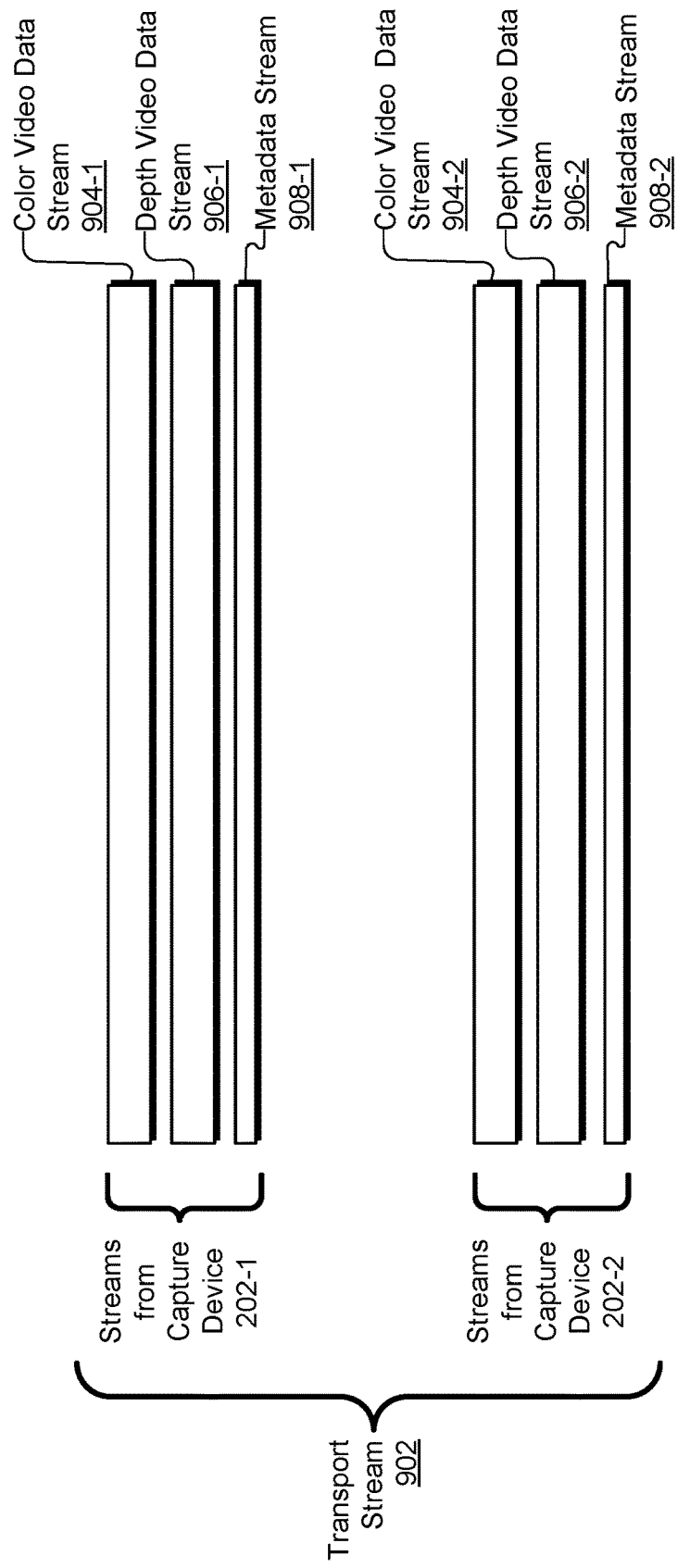
FIG. 9 illustrates an additional exemplary transport stream that may be provided based on the exemplary flow diagram illustrated in FIG. 8 according to principles described herein.

FIG. 9 illustrates an exemplary transport stream 902 that may be provided based on the dataflow 800 illustrated in FIG. 8. As shown in FIG. 9, transport stream 902 may only include the streams associated with capture devices 202-1 and 202-2. For example, the streams from capture device 202-1 include a color video data stream 904-1, a depth video data stream 906-1, and a metadata stream 908-1. Similarly, the streams from capture device 202-2 include a color video data stream 904-2, a depth video data stream 906-2, and a metadata stream 908-2. All other color video data streams and depth video data streams (e.g., the color video data stream and the depth video data stream for capture device 202-n) may be specifically excluded from being in transport stream 902 based on feedback 804. Although FIG. 9 shows the metadata provided as separate metadata streams 908 within transport stream 902, it is understood that the metadata associated with capture devices 202-1 and 202-2 may be provided in any other suitable manner, such as described herein.

Figure 10:
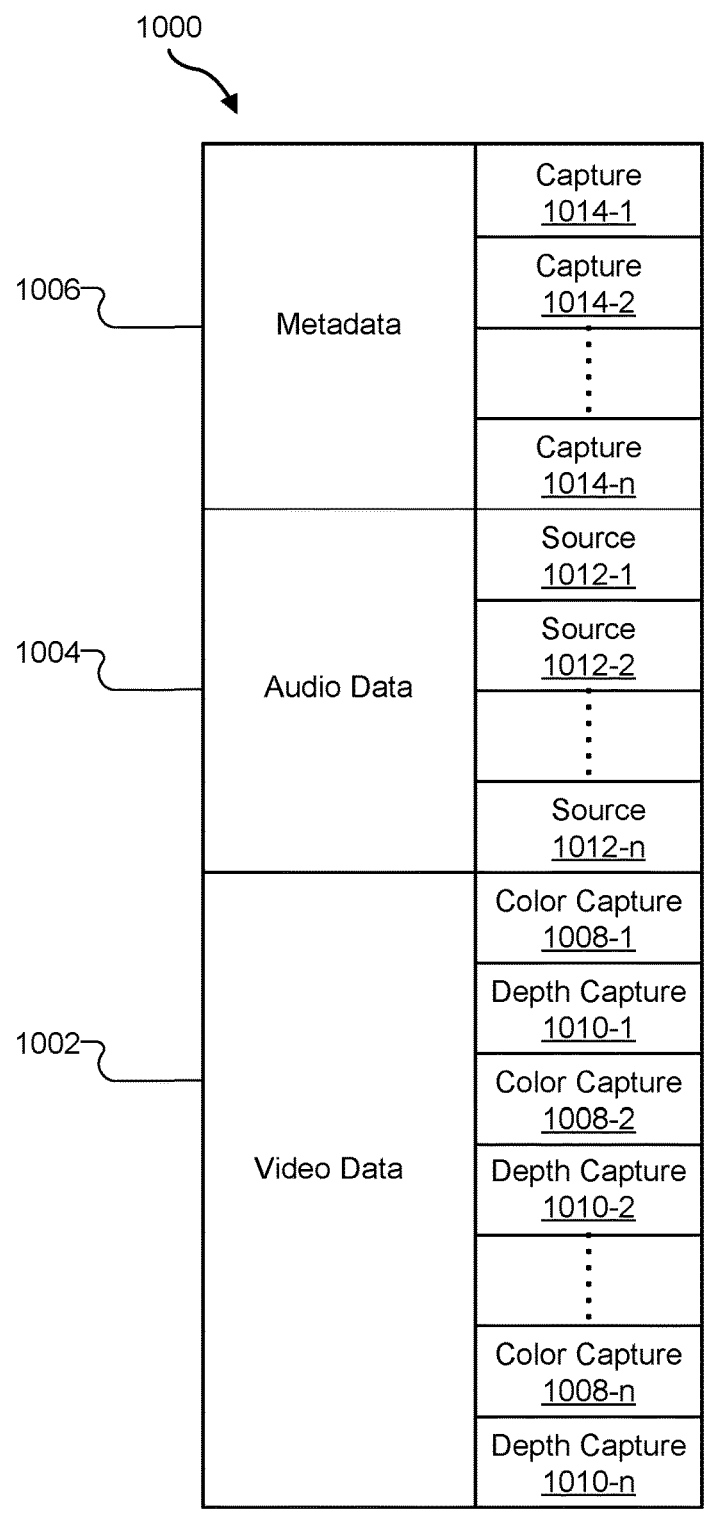
FIG. 10 illustrates an exemplary chart showing exemplary data that may be included in a transport stream according to principles described herein.

FIG. 10 illustrates an exemplary chart 1000 showing data that may be included in a transport stream for n number of capture devices 202. As shown in FIG. 10, the transport stream may include video data 1002, audio data 1004, and metadata 1006. Video data 1002 may include the color video data stream and the depth video data stream associated with each respective capture device 202. As shown in FIG. 10, video data 1002 may include 2D color data captures 1008 (e.g., 2D color data captures 1008-1 through 1008-n) and 2D depth data captures 1010 (e.g., 2D depth data captures 1010-1 through 1010-n) for each of n number of capture devices 202. For example, 2D color data capture 1008-1 may include 2D color data captured by capture device 202-1. Similarly, 2D depth data capture 1010-1 may include depth data captured by capture device 202-1, and so forth. In certain examples, 2D color data captures 1008 may be temporally aligned with each other and with each respective 2D depth data capture 1010 such that the surface data from each of capture devices 202 is temporally synchronized.

As mentioned above, in certain examples, the virtual reality content may include audio data. The audio data may be captured by any suitable audio capture device (e.g., microphone) in any suitable manner and may include any suitable audio content such as 2D audio, 3D audio, or spatial or positional audio. In certain examples, an audio capture device may be included as part of each capture device 202. Alternatively, an audio capture device may be provided separately from capture devices 202 (e.g., as a stand-alone audio capture device) and may not necessarily directly correspond to capture devices 202. In the example shown in FIG. 10, audio data 1004 includes audio sources 1012 (e.g., audio source 1012-1 through 1012-n). Each audio source 1012 shown in FIG. 10 may represent an audio data stream in the transport stream that includes audio data captured by a respective capture device 202 or by a respective audio capture device associated with a respective capture device 202. For example, audio source 1012-1 may correspond to an audio data stream that includes audio data captured by a microphone provided with capture device 202-1, audio source 1012-2 may correspond to an audio data stream that includes audio data captured by a microphone provided with capture device 202-2, and so forth. Accordingly, the audio data may represent spatial or positional 2D or 3D audio content captured from specific locations relative to the captured scene. Audio sources 1012 may be provided in the transport stream in any suitable manner. For example, each audio source 1012 may be provided as a separate stream within the transport stream. Each audio source 1012 may be temporally mapped to 2D color data captures 1008 and/or 2D depth data captures 1010 such that audio data 1004 is temporally synchronized with video data 1002.

As shown in FIG. 10, metadata 1006 may be included in the transport stream as metadata captures 1014 (e.g., metadata captures 1014-1 through 1014-n). Each metadata capture 1014 may include the metadata associated with a respective capture device 202. For example, metadata capture 1014-1 may include the metadata associated with capture device 202-1, metadata capture 1014-2 may include the metadata associated with capture device 202-2, and so forth. Metadata captures 1014 may be provided in the transport stream in any suitable manner. For example, each metadata capture 1014 shown in FIG. 10 may be provided as a separate metadata stream within the transport stream. Alternatively, metadata captures 1014 may be provided together in a global metadata stream within the transport stream or separately from the transport stream in any suitable manner, such as described herein.

In certain examples, metadata captures 1014 may each be temporally aligned with a respective 2D color data capture 1008 and a respective 2D depth data capture 1010 associated with a given capture device 202. For example, metadata capture 1014-1 may be temporally aligned with 2D color data capture 1008-1 and 2D depth data capture 1010-1 associated with capture device 202-1, metadata capture 1014-2 may be temporally aligned with 2D color data capture 1008-2 and 2D depth data capture 1010-2 associated with capture device 202-2, and so forth. In certain examples, metadata 1006 may include any suitable data associated with an audio source 1012. For example, metadata capture 1014-2 may include positional data indicating a position, within the scene, of a microphone used to capture the audio data represented in audio source 1012-1 and/or any other suitable information associated with the microphone and/or the audio data captured by the microphone. Media player device 210 may be configured to use captured audio data and metadata associated with audio sources 1012 in any suitable manner to provide a spatial audio representation (e.g., a surround sound representation) of the scene to user 214 in addition to a 3D representation of the scene that is provided based on surface data and corresponding metadata.

FIG. 11 illustrates an exemplary implementation 1102 of metadata that may be provided to media player device 210 in any of the ways described herein. Implementation 1102 may adhere to a JSON data format, a binary data format (e.g., a structured data format), or any other suitable data format as may serve a particular implementation. FIG. 11 shows exemplary data fields that may be used to define metadata associated with a particular capture device (e.g., capture device 202-1). A brief description of each of the fields shown in FIG. 11 will now be provided.

The field labeled "stream IDs" in the example shown in FIG. 11 may be populated with an identifier for the color video data stream and an identifier for the depth video data stream associated with a particular capture device. The identifiers may be represented using a string type variable or any other suitable data type. The identifiers may be in any suitable format for any suitable type of data stream. For example, for an MPEG transport stream, the identifiers may be packet identifiers ("PIDs") for packets in the MPEG transport stream.

The field labeled "depth mapping" in the example shown in FIG. 11 may be populated with "near" and "far" depth values provided initially by capture facility 106 and representative of a distance (e.g., from the particular capture device) of a minimum value of a representable range of values and a distance (e.g., from the particular capture device) of a maximum value of the representable range of values, respectively. The "near" and "far" depth values may map data values to real-world units and may be represented by floating point values or any other suitable data type. In an embodiment, this may include a more generalized "depth decode" in a format such as $$\begin{bmatrix} zw \\ w \end{bmatrix} = \begin{bmatrix} a & b \\ c & d \end{bmatrix} \begin{bmatrix} z' \\ 1 \end{bmatrix}$$

where $$z = \frac{(az' + b)}{(cz' + d)},$$

and provider system 102 (e.g., capture facility 106 of provider system 102) sends the matrix coefficients a, b, c, d.

The field labeled "3×4 column-major transform matrix" in the example shown in FIG. 11 may be populated with the transformation matrix to be used by media player device 210 to transform the data included in the color video data stream and the depth video data stream into coordinates in a common virtual 3D space.

The field labeled "FOV tangent angles" in the example shown in FIG. 11 may be populated with information indicating the field of view or intrinsic capture device parameters, such as those based on focal length, center point, etc., of the particular capture device in terms of view angles, tangents of angles (e.g., $\tan_{left}$, $\tan_{right}$, $\tan_{top}$, and $\tan_{bottom}$). In certain examples, metadata may additionally or alternatively include extrinsic capture device parameters and/or information related to linear and/or non-linear depth disparity associated with capture devices and/or captured surface data.

Implementation 1102 shown in FIG. 11 is illustrative of one way that metadata may be represented and provided to media player device 210 in certain examples. In other examples, metadata may be represented in any other format and may include any additional or alternative information as may be suitable for a particular implementation.

Returning to FIG. 2, media player device 210 may receive data representative of virtual reality content (e.g., surface data and metadata) from virtual reality media provider system 102 by way of network 212. The data may be transmitted, carried, and received over network 212 in any suitable way and may be represented in any suitable data transmission format and/or protocol, including in any of the exemplary data formats described herein. For examples, media player device 210 may receive any of the exemplary transport streams and/or metadata described herein.

Media player device 210 may be configured to access and use metadata, 2D color data, and depth data received from virtual reality media provider system 102 to generate a 3D representation of scene 206. Media player device 210 may be further configured to use the 3D representation of scene 206 to provide a view of the 3D representation to be experienced by user 214 from a viewpoint within a virtual 3D space. To this end, media player device 210 may incorporate media player device system 104 and may perform any operations of media player device system 104.

As used herein, a "3D representation" of a scene refers to at least a partial virtual 3D construction of a scene (e.g., at least a partial virtual 3D construction of one or more objects present within the scene). For example, media player device 210 may receive and use metadata and surface data for a scene to render at least the surfaces of an object within the scene that are visible to user 214 from a particular viewpoint within the virtual 3D space. In certain examples, the 3D representation may be considered a partial 3D representation because surfaces that are not visible to user 214 from the viewpoint of the user 214 (e.g., the far side of the object) may not be rendered by media player device 210.

As used herein, a "virtual 3D space" refers to a virtual reality space of a virtual 3D world. The virtual 3D space, which may be represented based on a set of virtual 3D world coordinates, may be generated and used by media player device 210 to render a 3D representation of a scene to be experienced by user 214. Within the virtual 3D space, user 214 may look in any direction (e.g., forward, backward, left, right, down, and/or up from a viewpoint of user 214 with respect to a 3D representation of the scene. Additionally, user 214 may move the viewpoint of the user 214 around to other locations within the virtual 3D space (i.e., by dynamically selecting different dynamically selectable viewpoints of the scene). In certain examples, the virtual 3D space may be referred to herein as an immersive virtual reality world. An example of a virtual 3D space is provided herein.

Media player device 210 may include or be implemented by any device capable of receiving data representative of virtual reality content, such as metadata and 2D surface data for a scene as described herein, and processing the received data to generate a 3D representation of the scene. Media player device 210 may use the 3D representation of the scene to render and present a view of the 3D representation of the scene from a selected viewpoint within the 3D representation of the scene, which view may be a field of view of an immersive virtual reality world (e.g., an immersive virtual reality world representative of a real-world event). Media player device 210 may also detect user input from user 214 and, based on the user input, dynamically update the field of view of the immersive virtual reality world to be rendered and presented as user 214 experiences the immersive virtual reality world.

For example, a field of view from a viewpoint within the immersive virtual reality world may provide a window through which user 214 may easily and naturally look around the immersive virtual reality world. The field of view may be presented by media player device 210 (e.g., on a display screen of media player device 210) and may include video depicting objects surrounding the viewpoint of user 214 within the immersive virtual reality world. Additionally, the field of view may dynamically change in response to user input provided by user 214 as user 214 experiences the immersive virtual reality world. For example, media player device 210 may detect user input (e.g., moving or turning the display screen upon which the field of view is presented). In response, the field of view may display different objects and/or objects seen from a different viewpoint (e.g., a viewpoint corresponding to the position of the display screen) in place of the objects seen from the previous viewpoint.

To facilitate user 214 in experiencing virtual reality content, media player device 210 may include or be associated with at least one display screen (e.g., a head-mounted display screen built into a head-mounted virtual reality device or a display screen of a mobile device mounted to the head of the user with an apparatus such as a cardboard apparatus) upon which views of a virtual reality world may be displayed. Media player device 210 may also include software configured to receive, maintain, and/or process 2D color data and depth data representative of the virtual reality world, together with corresponding metadata, to present (e.g., render) views of the virtual reality world on the display screen(s) of media player device 210. For example, media player device 210 may include dedicated, standalone software applications (e.g., mobile applications) configured to process and present data representative of a virtual reality world on the display(s). In other examples, the software used to present the particular views of the virtual reality world may include non-dedicated software such as a standard web browser application.

Additionally or alternatively, media player device 210 may include hardware configured to facilitate receiving, decoding, demultiplexing, and/or processing 2D color data and depth data included in a transport stream (e.g., transport stream 308). For example, media player device 210 may include a graphics card having dedicated video decoding hardware (e.g., one or more dedicated video decoders) and a programmable GPU.

Media player device 210 may take one of several different form factors. For example, media player device 210 may include or be implemented by a head-mounted virtual reality device (e.g., a virtual reality gaming device) that includes a head-mounted display screen, by a personal computer device (e.g., a desktop computer, laptop computer, etc.), by a mobile or wireless device (e.g., a smartphone, a tablet device, a mobile reader, etc.), or by any other device or configuration of devices that may serve a particular implementation to facilitate receiving and/or presenting virtual reality content. Different types of media player devices (e.g., head-mounted virtual reality devices, personal computer devices, mobile devices, etc.) may provide different types of virtual reality experiences having different levels of immersiveness for user 210.

While examples of certain media player devices have been described, the examples are illustrative and not limiting. A media player device may include any suitable device and/or configuration of devices configured to facilitate receipt of virtual reality content provided according to principles described herein and configured to use the virtual reality content to render a 3D representation of a scene. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

In certain examples, media player device 210 may receive, process, and present virtual reality content in real time (e.g., at the same time in which events in the scene are occurring or after a trivial period of delay) or near real time (e.g., after a slight delay for acquiring, processing, transmitting, and/or rendering virtual reality content. In other examples, media player device 210 may receive, process, and present virtual reality content in a time-shifted manner, later in time from when events in the scene occurred.

To support time-shifted viewing of virtual reality content, system 100 may store and maintain, subsequent to acquiring the surface data of the scene, a recording of the surface data representative of the scene and corresponding metadata. Then, when user 214 later wishes to experience the scene, virtual reality media content provider system 102 may provide the recorded surface data and metadata to media player device 210 for media player device 210 to use to generate a 3D representation of the scene in a virtual 3D space in a time-shifted manner.

Media player device 210 may process the surface data and corresponding metadata, such as the metadata and the color video data streams and the depth video data streams included in a transport stream received by media player device 210 in any suitable manner to generate a 3D representation of the scene within a virtual 3D space. In certain examples, for instance, media player device 210 may generate a 3D representation of a scene within a virtual 3D space and render a view of the 3D representation of the scene from a viewpoint in the virtual 3D space in any of the ways described in co-pending U.S. patent application Ser. No. 15/610,586 titled "Methods and Systems for Rendering Virtual Reality Content Based on Two-Dimensional ("2D") Captured Imagery of a Three-Dimensional ("3D") Scene" and filed the same day as the present application, which application is hereby incorporated by reference herein in its entirety. In other examples, media player device 210 may generate a 3D representation of a scene within a virtual 3D space and render a view of the 3D representation of the scene from a viewpoint in the virtual 3D space in any other suitable way, including by using any known techniques for generating a 3D model of the scene based on data received from virtual reality media provider system 102 and rendering a view of the 3D model of the scene from a viewpoint within the scene.

Figure 12:
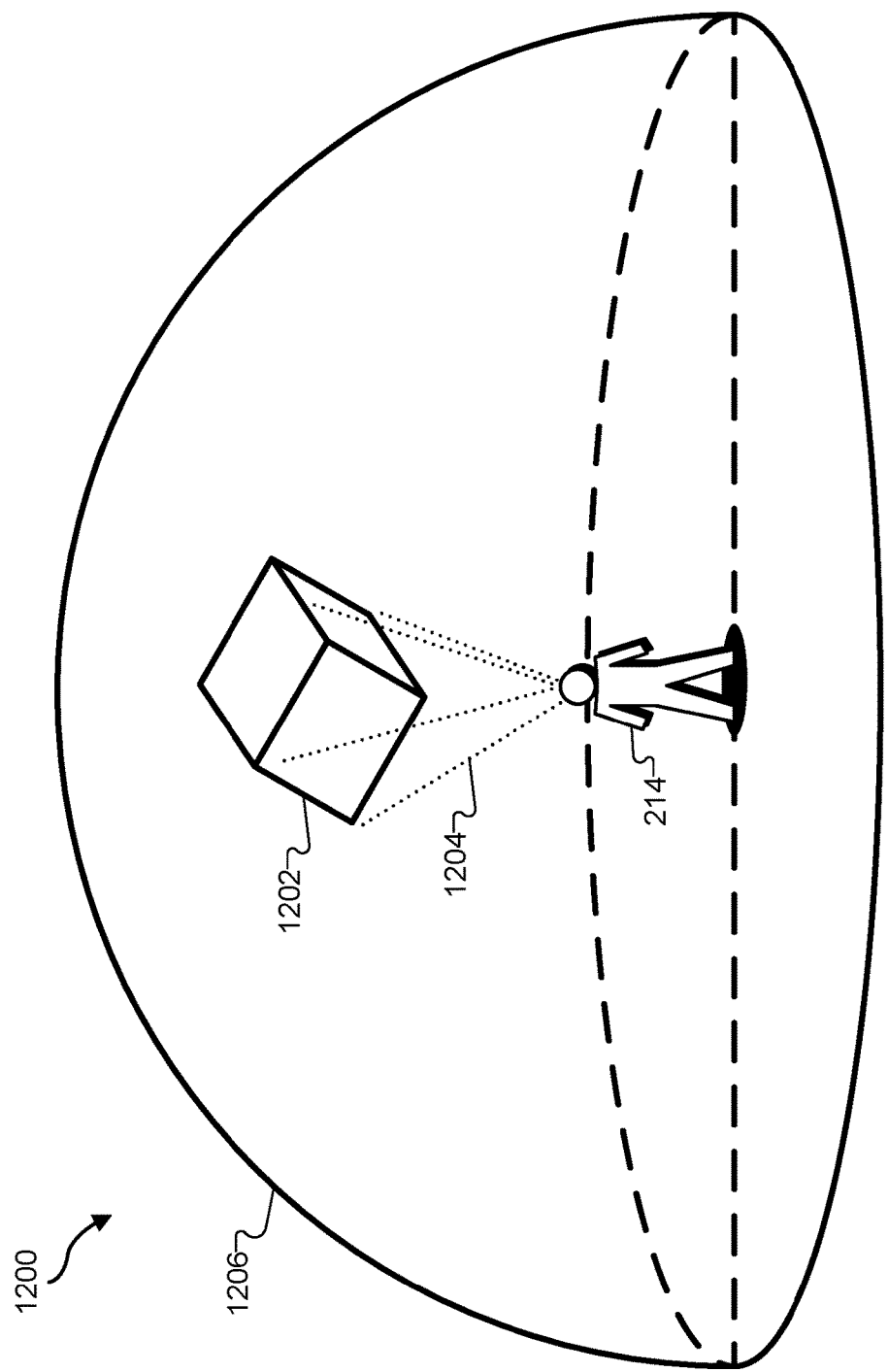
FIG. 12 illustrates an exemplary rendering by a media player device of a 3D representation of an object within a virtual 3D space according to principles described herein.

Media player device 210 may present a 3D representation of a scene to a user in a virtual 3D space (e.g., a virtual reality world) in any suitable manner. To illustrate, FIG. 12 shows an exemplary virtual reality experience 1200 in which media player device 210 presents user 214 with a view of a 3D representation 1202 of an object (e.g., object 208) included in a scene (e.g., scene 206). Specifically, a view of 3D representation 1202 is presented within a field of view 1204 that shows the scene from a viewpoint corresponding to an arbitrary location right underneath an object in the scene. A virtual 3D space 1206 represents a virtual reality world based on the scene. Virtual 3D space 1206 and positions within virtual 3D space 1206 may be represented using a global coordinate system or in any other suitable way. User 214 may provide input to media player device 210 to experience virtual 3D space 1206, such as by providing user input (e.g., head movements, keyboard input, etc.) to look around and/or to move around (i.e., dynamically select a viewpoint from which to experience) virtual 3D space 1206, thereby changing the viewpoint within virtual 3D space 1206 and consequently the view of the scene that is presented by media player device 210.

In FIG. 12, virtual 3D space 1206 is illustrated as a semi-sphere, indicating that user 214 may look in any direction within virtual 3D space 1206 that is substantially forward, backward, left, right, and/or up from the viewpoint of the location under the 3D representation 1202. In other examples, virtual 3D space 1206 may include an entire 360-degree by 180-degree sphere such that user 214 may also look down. Additionally, user 214 may move around to other locations within virtual 3D space (i.e., dynamically selecting different dynamically selectable viewpoints of the scene). For example, user 214 may select a viewpoint from the left of 3D representation 1202, a viewpoint from the right of 3D representation 1202, a viewpoint suspended above the 3D representation 1202, or the like.

Figure 13:
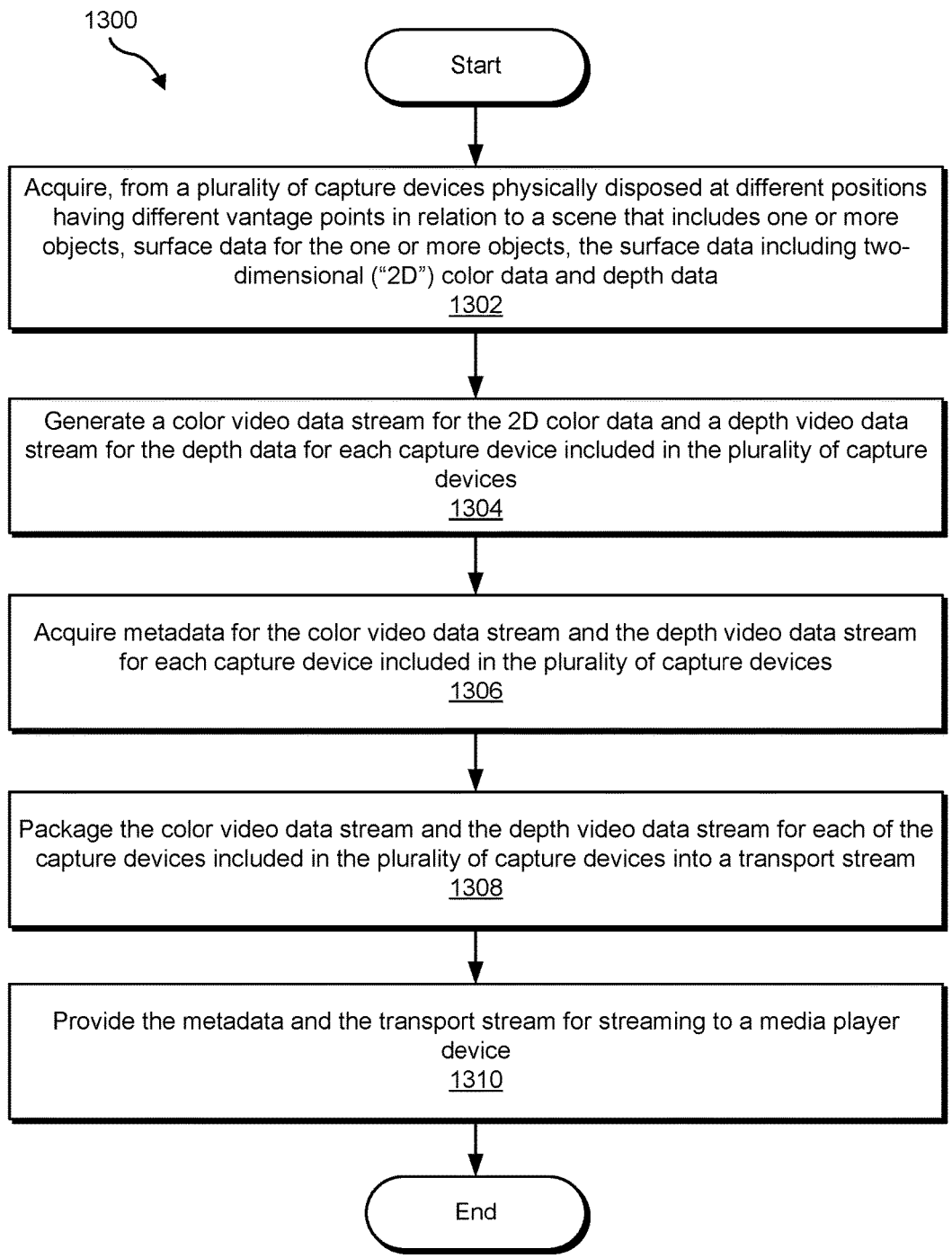
FIG. 13 illustrates an exemplary method for using two-dimensional ("2D") captured imagery of a scene to provide virtual reality content according to principles described herein.

FIG. 13 illustrates an exemplary method 1300 for using 2D captured imagery of a scene to provide virtual reality content. While FIG. 13 illustrates exemplary operations according to one embodiment, other embodiments may omit, add to, reorder, and/or modify any of the operations shown in FIG. 13. One or more of the operations shown in FIG. 13 may be performed by virtual reality media provider system 102 and/or any implementation thereof.

In operation 1302, a virtual reality media provider system (e.g., virtual reality media provider system 102) may acquire, from a plurality of capture devices physically disposed at different vantage points in relation to a scene that includes one or more objects, surface data for the one or more objects. In some examples, the surface data may include 2D color data and depth data for each capture device included in the plurality of capture devices. As described herein, the 2D color data and the depth data for each capture device included in the plurality of capture devices may represent a distinct unmeshed view of the scene from a particular vantage point (e.g., from a particular position having a particular capture angle) in relation to the scene. Operation 1302 may be performed in any of the ways described herein.

In operation 1304, the virtual reality media provider system may generate a color video data stream for the 2D color data and a depth video data stream for the depth data for each capture device included in the plurality of capture devices. Operation 1304 may be performed in any of the ways described herein.

In operation 1306, the virtual reality media provider system may acquire metadata for the color video data stream and the depth video data stream for each capture device included in the plurality of capture devices. In some examples, the virtual reality media provider system may generate the metadata based on information received from the plurality of capture devices. Alternatively, all or at least some of the metadata may be acquired from another source such as a data storage facility or a third party. Operation 1306 may be performed in any of the ways described herein.

In operation 1308, the virtual reality media provider system may package the color video data stream and the depth video data stream for each of the capture devices included in the plurality of capture devices into a transport stream. The transport stream may include, for each of the capture devices included in the plurality of capture devices, data representing a respective distinct unmeshed view of the scene from a respective vantage point in relation to the scene. In some examples, each color video data stream packaged in the transport stream may include 2D color data formatted as a series of sequential 2D color data captures of the scene captured by a respective capture device included in the plurality of capture devices, and each depth video data stream packaged in the transport stream may include depth data formatted as a series of sequential 2D depth data captures of the scene captured by a respective capture device included in the plurality of capture devices. Operation 1308 may be performed in any of the ways described herein.

In operation 1310, the virtual reality media provider system may provide the metadata and the transport stream for streaming to a media player device. The media player device may be configured to use the metadata and the transport stream to generate a 3D representation of the scene within a virtual 3D space. In certain examples, the virtual reality media provider system may stream the metadata and the transport stream to the media player device. Alternatively, the virtual reality media provider system may provide the metadata and the transport stream to a CDN and/or a third party (e.g., a CDN operated by Amazon Web Services), which then streams the metadata and the transport stream to the media player device in any suitable manner. Operation 1310 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
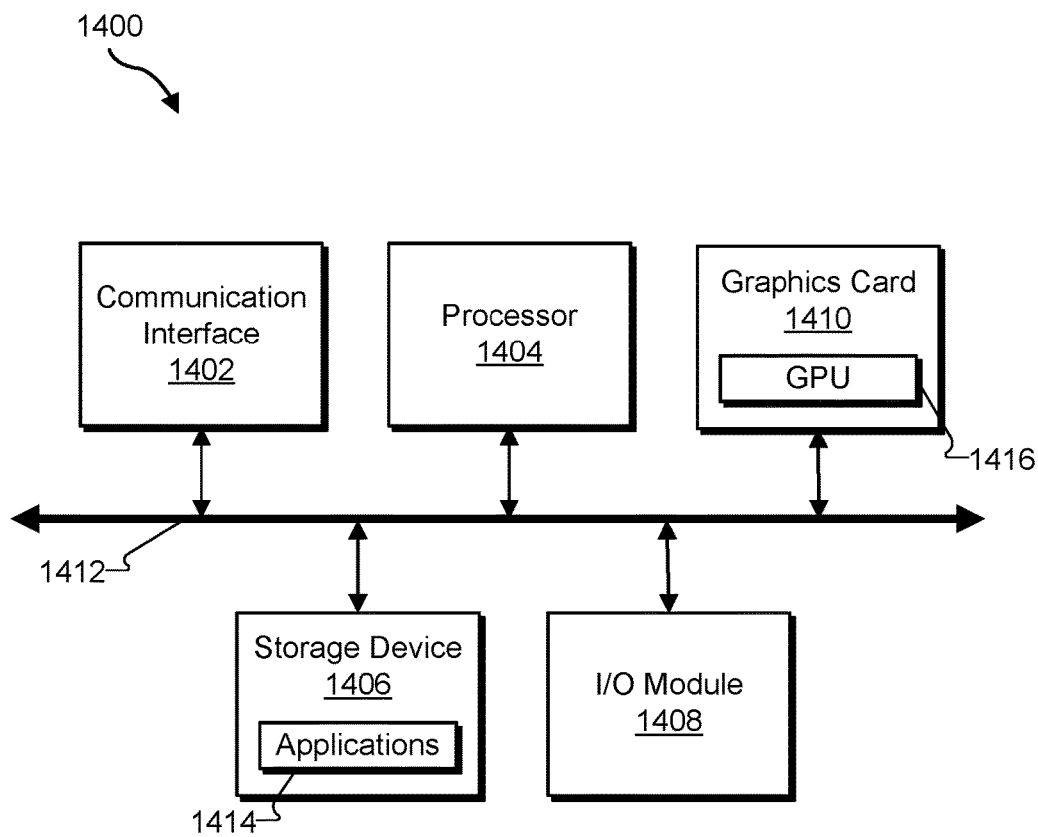
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, an input/output ("I/O") module 1408, and a graphics card 1410 communicatively connected via a communication infrastructure 1412. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit (e.g., a central processing unit) capable of processing data or interpreting, executing, and/or directing execution of one or more of the instructions, processes, and/or operations described herein. Processor 1404 may direct execution of operations in accordance with one or more applications 1414 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1414 configured to direct processor 1404 to perform any of the operations described herein may be stored within storage device 1406. In some examples, data may be arranged in one or more databases residing within storage device 1406. In certain examples, storage device 1406 may maintain surface data, metadata, data streams, video streams, transport streams, and/or any other data received, generated, managed, maintained, used, and/or transmitted by facilities 106 through 116. The storage facility may further include any other data as may be used by facilities 106 through 116 to perform one of more of the operations described herein.

I/O module 1408 may include one or more I/O modules configured to receive user input and provide user output. One or more I/O modules may be used to receive input for a single virtual reality experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation. I/O module 1408 may be omitted from certain implementations.

In some examples, any of the facilities described herein may be implemented by or within one or more components of computing device 1400. For example, one or more applications 1414 residing within storage device 1406 may be configured to direct processor 1404 to perform one or more processes or functions associated with data capture facility 106, data processing facility 108, data encoding facility 110, or data multiplexing facility 112 of virtual reality media provider system 102 (see FIG. 1). Alternatively, one or more applications 1414 residing within storage device 1406 may be configured to direct processor 1404 to perform one or more processes or functions associated with data decoding/demuxing facility 114 or data rendering facility 116 of media player device system 104 (see FIG. 1). Likewise, any suitable storage facility associated with system 100 may be implemented by or within storage device 1406.

Graphics card 1410 may include any suitable graphics card (e.g., a commercially available graphics card) having dedicated video decoding hardware (e.g., one or more dedicated video decoders) and a programable GPU 1416. Graphics card 1410 may include additional components in certain embodiments. Graphics card 1410 and/or GPU 1416 may be configured to execute and/or assist processor 1404 in executing one or more of the exemplary operations described herein. Graphics card 1410 may include any suitable number of graphics cards and/or GPUs as may suit a particular implementation.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A method comprising:
    acquiring, by a virtual reality media provider system from a plurality of capture devices physically disposed at different vantage points in relation to a scene that includes one or more objects, surface data for the one or more objects, the surface data including a distinct set of two-dimensional (2D) color data and depth data for each capture device included in the plurality of capture devices, each distinct set of 2D color data and depth data representing a distinct unmeshed view of the scene from a respective vantage point of a respective capture device included in the plurality of capture devices;

acquiring, by the virtual reality media provider system, metadata for each distinct set of 2D color data and depth data;

generating, by the virtual reality media provider system, a separate color data stream and a separate depth data stream for each distinct set of 2D color data and depth data captured by each capture device included in the plurality of capture devices;

packaging, by the virtual reality media provider system, each separate depth data stream and each separate color data stream associated with each capture device included in the plurality of capture devices into a transport stream such that the transport stream includes data representing each distinct unmeshed view of the scene from each respective vantage point of each respective capture device; and providing, by the virtual reality media provider system, the metadata and the transport stream for streaming to a media player device;

wherein each distinct unmeshed view of the scene is not combined together with any other distinct unmeshed view of the scene captured by any other capture device included in the plurality of capture devices prior to the packaging of each separate depth data stream and each separate color data stream into the transport stream.

2. The method of claim 1, wherein the transport stream includes:
   a first distinct set of 2D color data and depth data for a first capture device included in the plurality of capture devices, the first distinct set of 2D color data and depth data representing a first unmeshed view of the scene from a vantage point of the first capture device; and
   a second distinct set of 2D color data and depth data for a second capture device included in the plurality of capture devices, the second set of 2D color data and depth data representing a second unmeshed view of the scene from a vantage point of the second capture device, the vantage point of the second capture device different from the vantage point of the first capture device.

3. The method of claim 1, wherein the metadata includes transformation matrix information for use by the media player device to transform the distinct sets of 2D color data and depth data from local coordinate systems of the capture devices into coordinates of a virtual three-dimensional (3D) space.

4. The method of claim 1, wherein the metadata includes information indicating a relative position and a capture angle with respect to the scene of each capture device included in the plurality of capture devices.

5. The method of claim 1, wherein the metadata includes information about intrinsic and extrinsic properties of each capture device included in the plurality of capture devices.

6. The method of claim 1, further comprising:
   generating, by the virtual reality media provider system, a metadata stream for each distinct set of 2D color data and depth data; and
   packaging, by the virtual reality media provider system, each metadata stream into the transport stream such that the transport stream includes metadata for each distinct unmeshed view of the scene from each respective vantage point of each respective capture device.

7. The method of claim 1, further comprising:
   generating, by the virtual reality media provider system, a global metadata stream that includes the metadata for each distinct set of 2D color data and depth data; and
   packaging, by the virtual reality media provider system, the global metadata stream into the transport stream.

8. The method of claim 1, wherein the providing of the metadata and the transport stream for streaming to the media player device comprises providing the metadata to be streamed separately from the transport stream.

9. The method of claim 1, embodied as computer-executable instructions on at least one non-transitory computer-readable medium.

10. The method of claim 1, wherein the packaging of each separate depth data stream and each separate color data stream into the transport stream includes multiplexing each separate depth data stream and each separate color data stream into a single stream within the transport stream.

11. The method of claim 1, wherein the packaging of each separate depth data stream and each separate color data stream into the transport stream includes:
   multiplexing each separate depth data stream associated with each capture device included in the plurality of capture devices into a single depth data stream within the transport stream; and
   multiplexing each separate color data stream associated with each capture device included in the plurality of capture devices into a single color data stream within the transport stream.

12. A system comprising:
   at least one physical computing device that:
      acquires, from a plurality of capture devices physically disposed at different vantage points in relation to a scene that includes one or more objects, surface data for the one or more objects, the surface data including a distinct set of two-dimensional (2D) color data and depth data for each capture device included in the plurality of capture devices, each distinct set of 2D color data and depth data representing a distinct unmeshed view of the scene from a respective vantage point of a respective capture device included in the plurality of capture devices;
      acquires metadata for each distinct set of 2D color data and depth data;
      generates a separate color data stream and a separate depth data stream for each distinct set of 2D color data and depth data captured by each capture device included in the plurality of capture devices;
      packages each separate depth data stream and each separate color data stream associated with each capture device included in the plurality of capture devices into a transport stream such that the transport stream includes data representing each distinct unmeshed view of the scene from each respective vantage point of each respective capture device; and
      provides the metadata and the transport stream for streaming to a media player device;
   wherein each distinct unmeshed view of the scene is not combined together with any other distinct unmeshed view of the scene captured by any other capture device included in the plurality of capture devices prior to the packaging of each separate depth data stream and each separate color data stream into the transport stream.

13. The system of claim 12, wherein the includes:
   a first distinct set of 2D color data and depth data for a first capture device included in the plurality of capture devices, the first distinct set of 2D color data and depth data representing a first unmeshed view of the scene from a vantage point of the first capture device; and
   a second distinct set of 2D color data and depth data for a second capture device included in the plurality of capture devices, the second set of 2D color data and depth data representing a second unmeshed view of the scene from a vantage point of the second capture device, the vantage point of the second capture device different from the vantage point of the first capture device.

14. The system of claim 12, wherein the metadata includes transformation matrix information for use by the media player device to transform the distinct sets of 2D color data and depth data from local coordinate systems of the capture devices into coordinates of a virtual three-dimensional (3D) space.

15. The system of claim 12, wherein the metadata includes information indicating a relative position and a capture angle with respect to the scene of each capture device included in the plurality of capture devices.

16. The system of claim 12, wherein the metadata includes information about intrinsic and extrinsic properties of each capture device included in the plurality of capture devices.

17. The system of claim 12, wherein the at least one physical computing device:
   generates a metadata stream for each distinct set of 2D color data and depth data; and
   packages each metadata stream into the transport stream such that the transport stream includes metadata for each distinct unmeshed view of the scene from each respective vantage point of each respective capture device.

18. The system of claim 12, wherein the at least one physical computing device:
   generates a global metadata stream that includes the metadata for each distinct set of 2D color data and depth data; and
   packages the global metadata stream into the transport stream.

19. The system of claim 12, wherein the at least one physical computing device provides the metadata to be streamed separately from the transport stream.

20. A system comprising:
   at least one physical computing device that:
      acquires, from a first capture device physically disposed at a first vantage point in relation to a scene that includes one or more objects, a first distinct set of two-dimensional (2D) color data and depth data for the first capture device, the first distinct set of 2D color data and depth data for the first capture device representing a first unmeshed view of the scene from the first vantage point of the first capture device at a point in time;
      acquires, from a second capture device physically disposed at a second vantage point in relation to the scene that includes the one or more objects, a second distinct set of two-dimensional (2D) color data and depth data for the second capture device, the second distinct set of 2D color data and depth data for the second capture device representing a second unmeshed view of the scene from the second vantage point of the second capture device at the point in time;
      acquires metadata for the first distinct set of 2D color data and depth data and the second distinct set of 2D color data and depth data;
      generates a separate color data stream and a separate depth data stream for each of the first distinct set of 2D color data and depth data and the second distinct set of 2D color data and depth data;
      packages each separate color data stream and each separate depth data stream associated with the first capture device and the second capture device into a transport stream such that the transport stream includes data representing the first distinct unmeshed view of the scene from the first vantage point of the first capture device and the second distinct unmeshed view of the scene from the second vantage point of the second capture device; and
      provides the metadata and the transport stream for streaming to a media player device;
   wherein the first unmeshed view and the second unmeshed view are not combined together or with any other unmeshed view of the scene prior to the packaging of each separate depth data stream and each separate color data stream into the transport stream.

* * * * *